(12) United States Patent
Casteels et al.

(10) Patent No.: US 12,479,885 B2
(45) Date of Patent: Nov. 25, 2025

(54) CHROMATOGRAPHY-FREE ANTIBODY PURIFICATION METHOD

(71) Applicant: Ablynx N.V., Zwijnaarde (BE)

(72) Inventors: Peter Casteels, Zwijnaarde (BE); Willem Van De Velde, Zwijnaarde (BE); Anthony Van De Putte, Zwijnaarde (BE); Sindi De Vrieze, Zwijnaarde (BE)

(73) Assignee: Ablynx N.V., Ghent-Zwijnaarde (BE)

( * ) Notice: Subject to any disclaimer, the term of this patent is extended or adjusted under 35 U.S.C. 154(b) by 1224 days.

(21) Appl. No.: 17/282,858

(22) PCT Filed: Oct. 8, 2019

(86) PCT No.: PCT/EP2019/077172
§ 371 (c)(1),
(2) Date: Apr. 5, 2021

(87) PCT Pub. No.: WO2020/074483
PCT Pub. Date: Apr. 16, 2020

(65) Prior Publication Data
US 2021/0371457 A1 Dec. 2, 2021

(30) Foreign Application Priority Data
Oct. 8, 2018 (EP) .................... 18199137

(51) Int. Cl.
| | | |
|---|---|---|
| *C07K 1/36* | (2006.01) | |
| *B01D 61/14* | (2006.01) | |
| *B01D 69/02* | (2006.01) | |
| *B01D 71/10* | (2006.01) | |
| *B01D 71/16* | (2006.01) | |
| *B01D 71/26* | (2006.01) | |
| *B01D 71/34* | (2006.01) | |
| *B01D 71/56* | (2006.01) | |
| *B01D 71/64* | (2006.01) | |
| *B01D 71/68* | (2006.01) | |
| *C07K 1/30* | (2006.01) | |
| *C07K 1/34* | (2006.01) | |
| *C07K 16/06* | (2006.01) | |

(52) U.S. Cl.
CPC .............. *C07K 1/36* (2013.01); *B01D 61/145* (2013.01); *B01D 69/02* (2013.01); *B01D 71/10* (2013.01); *B01D 71/16* (2013.01); *B01D 71/262* (2022.08); *B01D 71/34* (2013.01); *B01D 71/56* (2013.01); *B01D 71/64* (2013.01); *B01D 71/68* (2013.01); *C07K 1/30* (2013.01); *C07K 1/34* (2013.01); *C07K 16/065* (2013.01); *B01D 2311/08* (2013.01); *B01D 2311/2642* (2013.01); *B01D 2315/16* (2013.01); *B01D 2317/022* (2013.01); *B01D 2317/025* (2013.01); *B01D 2325/0283* (2022.08); *B01D 2325/20* (2013.01); *C07K 2317/569* (2013.01)

(58) Field of Classification Search
CPC ... C07K 1/36; C07K 1/30; C07K 1/34; C07K 16/065; B01D 61/145; B01D 69/02; B01D 71/10; B01D 71/16; B01D 71/262; B01D 71/34; B01D 71/56; B01D 71/64; B01D 71/68; B01D 2311/08; B01D 2311/2642; B01D 2315/16
See application file for complete search history.

(56) References Cited

U.S. PATENT DOCUMENTS

| | | |
|---|---|---|
| 4,897,465 A | 1/1990 | Cordle et al. |
| 2004/0072322 A1 | 4/2004 | Thorne |
| 2015/0368293 A1 | 12/2015 | Barata et al. |
| 2018/0044395 A1 | 2/2018 | Gant et al. |

FOREIGN PATENT DOCUMENTS

| | | |
|---|---|---|
| CN | 1279688 A | 1/2001 |
| CN | 105358572 A | 2/2016 |
| WO | WO 1999/019343 A1 | 4/1999 |
| WO | WO 2014/056026 A1 | 4/2014 |
| WO | WO 2014/180852 A1 | 11/2014 |
| WO | WO 2016/144658 A1 | 9/2016 |

OTHER PUBLICATIONS

Sun et al. High throughput detection of antibody self-interaction by bio-layer interferometry. Aug. 19, 2013;5(6):838-841. (Year: 2013).*
EP1819737.3, Apr. 16, 2019, Extended European Search Report.
PCT/EP2019/077172, Feb. 10, 2020, International Search Report and Written Opinion.
PCT/EP2019/077172, Apr. 22, 2021, International Preliminary Report on Patentability.

* cited by examiner

*Primary Examiner* — Shafiqul Haq
(74) *Attorney, Agent, or Firm* — Wolf, Greenfield & Sacks, P.C.

(57) ABSTRACT

The present invention relates method for purifying antibodies, said method comprising a limited number of steps while still allowing obtaining high yields of purified antibodies with an appropriate degree of purity. Briefly, this method comprises only filtration and precipitation steps, omitting the need for chromatography steps.

20 Claims, 1 Drawing Sheet

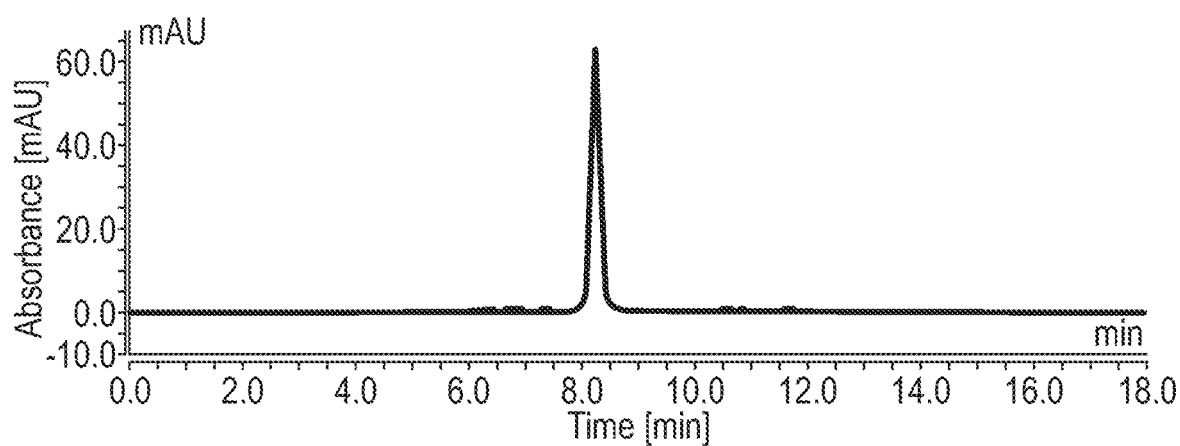
Overlay of the different SE-HPLC analysis of the different samples of the MIP run

CHROMATOGRAPHY-FREE ANTIBODY PURIFICATION METHOD

RELATED APPLICATIONS

This Application is a national stage filing under 35 U.S.C. 371 of International Patent Application Serial No. PCT/EP2019/077172, filed Oct. 8, 2019, the content of which is incorporated by reference herein in its entirety.

1 FIELD OF THE INVENTION

The present invention relates to a method for purifying antibodies, said method comprising a limited number of steps while still allowing obtaining high yields of purified antibodies with an excellent degree of purity. Briefly, this method comprises only filtration and precipitation steps, omitting the need for chromatography steps.

2 BACKGROUND

Antibody purification can be one of the costliest aspects of bioproduction. Antibodies (Abs) and fragments thereof are generally purified using a multi-step, chromatography process, using a specific resin and buffer system at each chromatography step. This conventional purification process encompasses a capture step, followed by an ionic exchange step, and concludes with an UF/DF step. With increasing cell culture titers and larger cell culture volumes being used for production, downstream processing is viewed as a bottleneck in industry. This is particularly relevant to monoclonal antibody (mAb) production, where the focus has shifted away from batch volume towards downstream processing capacity. Furthermore, early pre-clinical and clinical phase studies require larger amounts of antibodies that can be produced more rapidly. In addition, the chromatography steps are one of the most important factors determining the cost-of-goods (CoG).

The industry explored reducing the number of steps to be used for antibody purification.

WO2011/090719 discloses a method for purifying antibodies, said method comprising 2 or 3 chromatography steps, the first chromatography step involving the use of a protein A column, the second chromatography step involving the use of a cation-exchange chromatography column, and the optional third chromatography step involving the use of an anion-exchange chromatography column.

WO2009/111347 discloses the loading of a multi-modal resin chromatography at a pH higher than the one conventionally used in Protein A column elution buffers, which suggests a need of buffer exchange between the two chromatography steps.

WO2014/180852 relates to a 3-step chromatography process for small and large-scale purification of proteins, specifically mAbs, using four buffer solutions made from a mother solution.

WO2013/075740 describes an antibody purification method using a 2-step chromatography process for the purification of proteins, using only 4 buffer solutions made from a mother solution.

WO2010/056550 describes a Nanobody purification process using inter alia 2 chromatography steps.

The widespread use of chromatography steps in antibody purification can be explained by the success of this process in the quality of the purified product, which may eventually be used in humans. Therefore, it is preferred that any new method of purification must retain a quality allowing the eventual product to be used in humans.

Reducing the number of chromatography steps to only 2 drove the processing time and CoG down.

However, there remains a need to optimize antibody purification, such as a further decrease of the CoG of antibody production and processing time, while preferably retaining quality.

3 SUMMARY OF THE INVENTION

A problem with purifying proteins of interest, such as Abs, from host cells is the vast amount and size of the impurities. These impurities can be larger than the proteins of interest, smaller than the proteins of interest or even have the same size than the proteins of interest. This makes the purification process a challenging task, which is contemporaneously addressed by lengthy and expensive chromatography methods.

The inventors have found a new method for purifying antibodies, said method comprising a limited number of steps while still allowing obtaining high yields of purified antibodies with an excellent degree of purity. Briefly, this method comprises only filtration and precipitation steps. After demonstrating the suitability in obtaining purified proteins, the present inventors also showed that the process was readily scalable. The cost-of-goods of the present purification method were substantially lower than the conventional chromatography processes. Indeed, upscaling to 100 L was already 86% cheaper than comparable chromatography methods. In addition, the process could be further simplified by using a single, Tangential Flow Filtration device, requiring only exchange of cassettes and buffers. To further minimize the CoG, the number of DV steps can be minimized, while maintaining the required degree of purity.

In essence, the method of the invention for purifying a protein from solution essentially comprises:
 (a) a first filtration step, in which the protein of interest is separated from larger impurities;
 (b) a second filtration step, in which the protein of interest is separated from smaller impurities;
 (c) a precipitation, wash and resuspension step, in which the protein of interest is separated from any further remaining impurities; and
 (d) an Ultrafiltration/Diafiltration (UF/DF) step, in which the protein of interest is concentrated in a primary buffer.

Next, the primary buffer can readily be adapted by adding excipients according to the specific need for the purified protein, such as lyophilization, administration, etc. If necessary, the resulting formulated protein can be filtered for long term storage (optional step (e)).

In particular, the present invention relates to a method for purifying a protein from solution comprising:
 (a) a first filtration step comprising: (i) passing said solution through a first membrane, resulting in a first permeate, wherein said first membrane has a pore size of between 40 kDa and 100 kDa, preferably between 40 kDa and 80 kDa, even more preferably 50 kDa, nominal molecular weight cut-off (NMWCO);
 (b) a second filtration step comprising: (i) concentrating the first permeate obtained at the end of step (a) using a second membrane, resulting in a first retentate comprising said protein, wherein said second membrane has a pore size of between 2 kDa and 50 kDa, such as between 4 kDa and 40 kDa, between 6 kDa and 30 kDa, between 8 kDa and 20 kDa, more preferably 10 kDa or 15 kDa NMWCO;

(c) a precipitation, wash and resuspension step comprising: (i) precipitating said first retentate comprising said protein obtained at the end of step (b) until a precipitate comprising said protein is formed; (ii) washing said precipitate comprising said protein using a third membrane; (iii) resuspending the washed precipitate obtained at the end of step (c)(ii), resulting in a second retentate comprising said protein; (iv) filtrating the second retentate comprising said protein obtained at the end of step (c)(iii) through a third membrane, resulting in a second permeate comprising said protein, wherein said third membrane has a pore size between 0.05-0.35 µm, such as 0.1-0.3 µm or between 0.15-0.25 µm, such as 0.2 µm;

(d) an Ultrafiltration/Diafiltration (UF/DF) step comprising: (i) diafiltrating the second permeate comprising said protein obtained at the end of step (c) using a fourth membrane, resulting in a first diafiltrate comprising said protein, wherein said fourth membrane has a pore size of between 2 kDa and 50 kDa, such as between 4 kDa and 40 kDa, between 6 kDa and 30 kDa, between 8 kDa and 20 kDa, more preferably 10 kDa or 15 kDa (NMWCO; (ii) concentrating the first diafiltrate comprising said protein obtained at the end of step (d)(i) using said fourth membrane, resulting in a third retentate comprising said protein; (iii) diafiltrating the third retentate comprising said protein of step (d)(ii) using said fourth membrane, resulting in a second diafiltrate comprising said protein;

(e) optionally a formulation and final filtration step comprising: (i) formulating said second diafiltrate comprising said protein obtained at the end of step (d) in formulating buffer, resulting in a formulated product comprising said protein; and (ii) optionally filtering the formulated product;

wherein the protein has a molecular weight (MW) of between 5 kDa-200 kDa, preferably said protein has a MW of between 10 kDa and 150 kDa, preferably between 15 kDa and 100 kDa, even more preferably between 15 and 50 kDa, such as between 15-30 kDa, such as about 15 kDa or 20 kDa.

The present invention relates also to a method for purifying a protein from solution as described herein, wherein said first filtration step (a), and/or said second filtration step (b), and/or said precipitating step (c)(i), and/or said washing step (c)(ii), and/or said resuspending step (c)(iii), and/or said filtrating step (c)(iv), and/or said diafiltrating step (d)(i), and/or said concentrating step (d)(ii) and/or said diafiltrating step (d)(iii) are effected in a tangential flow filtration (TFF) or by normal flow filtration (NFF), preferably all steps (a), (b), (c)(i), (c)(ii), (c)(iii), (c)(iv), (d)(i), (d)(ii) and (d)(iii) are effected in one and the same device.

The present invention relates also to a method for purifying a protein from solution as described herein, wherein said first membrane, and/or said second membrane, and/or said third membrane, and/or said fourth membrane comprises regenerated cellulose, polypropylene, cellulose acetate, polylactic acid, ceramic polyether-sulfone, polyarylsulphones, polysulfone, polyimide, polyamide, polyvinylidenedifluoride (PVDF).

The present invention relates also to a method for purifying a protein from solution as described herein, wherein said first filtration step (a) comprises filtrating with 2-4 Diafiltrating Volumes (DV), such as 3 DV purified water.

The present invention relates also to a method for purifying a protein from solution as described herein, wherein between 50%-100% of said protein is recovered in the first permeate, such as between 60%-100%, or even between 80%-100%.

The present invention relates also to a method for purifying a protein from solution as described herein, wherein said first permeate comprising said protein comprises 10%-100% less impurities than said solution, such as 20%-100%, 30%-100%, 40%-100%, 50%-100%, 60%-100%, 70%-100%, or even 80%-100% less impurities than said solution.

The present invention relates also to a method for purifying a protein from solution as described herein, wherein said second filtration step (b) comprises using purified water.

The present invention relates also to a method for purifying a protein from solution as described herein, wherein the protein in said first retentate is concentrated to a concentration between 50-200 mg/ml, such as 75-175 mg/ml, or between 100-150 mg/ml, such as about 120 mg/ml or 125 mg/ml.

The present invention relates also to a method for purifying a protein from solution as described herein, wherein said precipitating is effected by a precipitation solution comprising a precipitating agent chosen from the group consisting of miscible solvents, non-ionic hydrophilic polymers, polyvalent metallic ions, such as $Ca^{2+}$, $Mg^{2+}$, $Mn^{2+}$ or $Fe^{2+}$, and neutral salts, preferably kosmotropes, most preferably $((NH_4)^+)_2(SO_4)^{2-}$.

The present invention relates also to a method for purifying a protein from solution as described herein, wherein said precipitating is effected at 1.4-2.2 M, such as 1.6-2.0 M, preferably about 1.8 M $((NH_4)^+)_2(SO_4)^{2-}$.

The present invention relates also to a method for purifying a protein from solution as described herein, wherein washing of said precipitate comprising said protein of step (c)(ii) comprises replacing the precipitation solution by a washing solution, and preferably washing said precipitate with 2-8 DVs, such as 4-6 DV, or 5 DV washing solution, preferably said washing solution comprises a precipitating agent with a concentration between 1.4-2.2 M, such as 1.6-2.0 M, preferably about 1.8 M, preferably said precipitating agent is $((NH_4)^+)_2(SO_4)^{2-}$.

The present invention relates also to a method for purifying a protein from solution as described herein, wherein the washed precipitate obtained at the end of step (c)(ii) is resuspended in a resuspension solution comprising a precipitating agent with a concentration between 0.8-0.4 M, such as 0.7-0.5 M, preferably about 0.6 M, preferably said precipitating agent is $((NH4)^+)_2(SO_4)^{2-}$.

The present invention relates also to a method for purifying a protein from solution as described herein, wherein the second permeate comprising said protein obtained at the end of step (c) is diafiltrated with between 1-4 Diafiltrating Volumes (DV), such as 1 DV primary buffer.

The present invention relates also to a method for purifying a protein from solution as described herein, wherein the protein in said third retentate has a concentration between 10-100 mg/ml, such as 25-80 mg/ml, or between 40-60 mg/ml, such as about 50 mg/ml or 55 mg/ml.

The present invention relates also to a method for purifying a protein from solution as described herein, wherein the third retentate comprising said protein obtained at the end of step (d)(ii) is diafiltrated with 1-8 Diafiltrating Volumes (DV), such as 3-6, or 4 DV or 5 DV primary buffer.

The present invention relates also to a method for purifying a protein from solution as described herein, wherein said formulated product comprises protein at a concentration of 10-100 mg/ml, such as 25-80 mg/ml, or between 40-60 mg/ml, such as about 50 mg/ml or 55 mg/ml protein;

primary buffer such as phosphate buffers, Tris buffers, acetate buffers, histidine buffers, HEPES buffers, preferably at the pH of the primary buffer is about 5 to about 7.5, preferably the concentration of the primary buffer is about 5 mM to about 50 mM, more preferably the primary buffer is 20 mM citrate, pH 6.0; and optionally a stabilizer chosen from the group consisting of sucrose, sorbitol, mannitol, glycine, inositol, sodium chloride, methionine, arginine, and arginine hydrochloride, from about 1-12%, preferably mannitol, preferably 10 mg/ml; and optionally a surfactant at a concentration of about 0.001% to 0.6%, chosen from the group consisting of polysorbate-20, polysorbate-40, polysorbate-60, polysorbate-65, polysorbate-80 polysorbate-85, poloxamer-188, sorbitan monolaurate, sorbitan monopalmitate, sorbitan monostearate, sorbitan monooleate, sorbitan trilaurate, sorbitan tristearate, sorbitan trioleaste.

4 DESCRIPTION OF THE FIGURES

FIG. 1: Overlay of the different SE-HPLC analysis of the different samples of the MIP run.

5 DETAILED DESCRIPTION

Unless indicated or defined otherwise, all terms used have their usual meaning in the art, which will be clear to the skilled person. Reference is for example made to the standard handbooks, such as Sambrook et al. (Molecular Cloning: A Laboratory Manual ($2^{nd}$ Ed.) Vols. 1-3, Cold Spring Harbor Laboratory Press, 1989), F. Ausubel et al. (Current protocols in molecular biology, Green Publishing and Wiley Interscience, New York, 1987), Lewin (Genes II, John Wiley & Sons, New York, N.Y., 1985), Old et al. (Principles of Gene Manipulation: An Introduction to Genetic Engineering ($2^{nd}$ edition) University of California Press, Berkeley, CA, 1981); Roitt et al. (Immunology ($6^{th}$ Ed.) Mosby/Elsevier, Edinburgh, 2001), Roitt et al. (Roitt's Essential Immunology ($10^{th}$ Ed.) Blackwell Publishing, UK, 2001), and Janeway et al. (Immunobiology ($6^{th}$ Ed.) Garland Science Publishing/Churchill Livingstone, New York, 2005), as well as to the general background art cited herein.

Unless indicated otherwise, all methods, steps, techniques and manipulations that are not specifically described in detail can be performed and have been performed in a manner known per se, as will be clear to the skilled person. Reference is for example again made to the standard handbooks and the general background art mentioned herein and to the further references cited therein; as well as to for example the following reviews Presta (Adv. Drug Deliv. Rev. 58 (5-6): 640-56, 2006), Levin and Weiss (Mol. Biosyst. 2(1): 49-57, 2006), Irving et al. (J. Immunol. Methods 248(1-2): 31-45, 2001), Schmitz et al. (Placenta 21 Suppl. A: S106-12, 2000), Gonzales et al. (Tumour Biol. 26(1): 31-43, 2005), which describe techniques for protein engineering, such as affinity maturation and other techniques for improving the specificity and other desired properties of proteins such as immunoglobulins.

Amino acid sequences are interpreted to mean a single amino acid or an unbranched sequence of two or more amino acids, depending of the context. Nucleotide sequences are interpreted to mean an unbranched sequence of 3 or more nucleotides.

Amino acids are those L-amino acids commonly found in naturally occurring proteins. Amino acid residues will be indicated according to the standard three-letter or one-letter amino acid code. Reference is for instance made to Table A-2 on page 48 of WO 08/020079. Those amino acid sequences containing D-amino acids are not intended to be embraced by this definition. Any amino acid sequence that contains post-translationally modified amino acids may be described as the amino acid sequence that is initially translated using the symbols shown in this Table A-2 with the modified positions; e.g., hydroxylations or glycosylations, but these modifications shall not be shown explicitly in the amino acid sequence. Any peptide or protein that can be expressed as a sequence modified linkages, cross links and end caps, non-peptidyl bonds, etc., is embraced by this definition.

Unless stated otherwise, the terms "approximately", "about" or "substantially" associated with a numeral value mean within a range of ±10% of said value.

The filtration step as described herein can be performed by any suitable means of mechanical, physical or biological operations that purifies. e.g. separate the protein of interest from impurities. Preferably, the filtration steps are performed using semipermeable membranes. Filtration can be effected with one or a plurality of devices wherein the feed protein containing solution is contacted with the devices in parallel or series flow.

As used herein, "semipermeable membrane" relates to any type of biological or synthetic, polymeric membrane comprising pores that will allow certain molecules or ions to pass through it by diffusion, facilitated diffusion, passive transport or active transport, while retaining other molecules. The rate of passage depends on the pressure, concentration, and temperature of the molecules or solutes on either side, as well as the permeability of the membrane to each solute. Depending on the membrane and the solute, permeability may depend on solute size, solubility, properties, and chemistry. The terms "semipermeable membrane" and "membrane" are used interchangeably throughout the disclosure and each has the same meaning for the purposes of this disclosure. Depending on the pore size of the membranes a distinction can be made between membranes used for micro-filtration and ultrafiltration. Membranes for microfiltration typically have a pore size between 0.1 μm and 10 μm. Membranes used for ultrafiltration typically have a pore size below 0.1 μm (e.g. 10 kD and 50 kD membranes).

In some embodiments, the membrane has a pore size of between 40 kDa and 100 kDa, preferably between 40 kDa and 80 kDa, even more preferably 50 kDa nominal molecular weight cut-off (NMWCO), for instance in the first filtration step (a).

In some embodiments, the membrane has a pore size of between 2 kDa and 50 kDa, such as between 4 kDa and 40 kDa, between 6 kDa and 30 kDa, between 8 kDa and 20 kDa, more preferably 10 kDa or 15 kDa NMWCO, for instance in the second filtration step (b) or the UF/DF step (d).

In embodiments, the membrane has a pore size between 0.05-0.35 μm, such as 0.1-0.3 μm or between 0.15-0.25 μm, such as 0.2 μm, for instance in the precipitation, wash and resuspension step (c).

Representative suitable membranes which can be utilized in the present method include those formed from regenerated cellulose, polypropylene, cellulose acetate, polylactic acid, ceramic polyether-sulfone, polyarylsulphones, polysulfone, polyimide, polyamide, polyvinylidenedifluoride (PVDF) or the like. These membranes can, for instance, be supplied in a cartridge (e.g. NFF) form or as cassettes (e.g. for TFF). In certain embodiments, the membrane is a Sartorius STIC® membrane, a Sartorius Q membrane (Sartobind®), or a Sartorius Hydrosart® membrane.

As used herein, "ultrafiltration" or "UF" refers to a or filtration technique using a semipermeable membrane to physically and selectively remove particles and/or ions from a solution based on particle size and size of the pores in the UF membrane. In general, the semipermeable membrane has very small (0.001 μm to 0.1 μm) pores to sort or concentrate molecules in a feed stream using a pressure differential across the membrane. UF membranes are sometimes classified on the basis of molecular weight cut-off (MWCO) rather than pore size.

Ultrafiltration can also be used for concentrating the protein of interest. Concentration via UF is a simple process that involves removing fluid from a solution while retaining the solute molecules. The concentration of the solute increases in direct proportion to the decrease in solution volume, i.e. halving the volume effectively doubles the concentration. To concentrate a sample, a UF membrane is chosen with a MWCO that is substantially lower than the molecular weight of the proteins to be retained, which assures retention and high recovery of the protein of interest (cf. the second filtration step (b) and the UF/DF step (d) of the present invention).

Ultrafiltration can also be used to purify smaller molecules, such as the protein of interest from larger impurities, such as host cells and process related impurities, which cannot pass the membrane (cf. the first filtration step (a) of the present invention).

The molecular weight cut-off (MWCO) of a membrane, sometimes called Nominal Molecular Weight Limit (NMWL) or nominal molecular weight cut-off (NMWCO), is defined by its ability to retain a given percentage of a globular solute of a defined molecular weight. Solute retention can vary due to molecular shape, structure, solute concentration, presence of other solutes and ionic conditions. Hence, the person skilled in the art will appreciate that MWCO ratings are based on globular molecules, while more linear molecules, which may have a small diameter in two of three dimensions, may be able to pass through the pores more freely despite having molecular weights that exceed the stated MWCO. To ensure proper retention of the protein of interest, the person skilled in the art can select a membrane having the required properties by performing some routine experimentation. A good general rule is to select a membrane with a MWCO that is 3 to 6 times lower than the molecular weight of the proteins of interest to be retained.

Traditionally, a membrane's MWCO refers to the smallest average molecular mass of a standard molecule that will not effectively diffuse across the membrane. As used herein, "Molecular weight cut-off" or "MWCO" refers to the lowest molecular weight solute (in daltons) in which 90% of the solute is retained by the membrane, or the molecular weight of the molecule (e.g. globular protein) that is 90% retained by the membrane. Preferred UF membranes having nominal MWCO ratings of 2 kDa, 3.5 kDa, 5 kDa, 7 kDa, 10 kDa, 15 kDa and 20 kDa, even more preferably 10 kDa. For instance, UF is used in step (b) and step (d) of the present invention.

As used herein, during the "concentration" part, an initial volume $V_0$ is concentrated to a final retentate volume ("V") and thus the volume concentration factor (VCF) can be defined as VCF=$V_0$/V. During (dia-)filtration, a diavolume (DV) is a measure of the extent of buffer exchange that has been performed during a (dia-)filtration step. If a constant-volume (dia-)filtration is being performed, where the retentate volume (V) is held constant and the (dia-)filtration volume $V_D$ enters at the same rate that the filtrate leaves, DV is calculated as DV=$V_D$/V. Other operational parameters that may impact step performance include filter design (such as channel size and shape) and material and construction, all of which are known by the person skilled in the art and all of which are assessed on a routine basis, e.g. evaluated during screening for suitable membranes.

As used herein, "Transmembrane Pressure" or "TMP" relates to the driving force for liquid transport through the membrane. It is calculated as the average pressure applied to the membrane minus any filtrate pressure. In most cases, pressure at filtrate port equals zero.

As used herein, "diafiltration" or "DF" refers a technique that uses semi-permeable membranes that separates larger molecules (retentate), which cannot pass the membrane, from smaller molecules, which can pass the membrane (permeate). DF washes smaller molecules through a semipermeable membrane (permeate) and leaves larger molecules in the retentate. DF can be used to completely remove, replace, or lower the concentration of salts or solvents from solutions (cf. steps (a), (c) and (d) of the present invention). DF can be performed either continuously or discontinuously.

In continuous diafiltration, the DF solution is added to the sample feed reservoir at the same rate as filtrate is generated. The result is that while the volume in the sample reservoir remains constant, the smaller molecules, which permeate the membrane are washed away.

In discontinuous diafiltration, the DF solution is first diluted to increase the initial volume and then concentrated as the filtrate is generated. The process is then repeated until the desired concentration of small molecules remaining in the sample reservoir is achieved.

Discontinuous diafiltration requires more filtrate volume to achieve the same degree or small molecule permeate reduction as continuous diafiltration.

DF processes sometimes use diafiltration volumes, which refers to the volume of the solution before the DF solution is added. Each additional diafiltration volume (DV) reduces the salt concentration further. In general, using 5 diafiltration volumes will reduce the ionic strength by ~99% with continuous diafiltration.

In connection with filtration as used herein, the term "retentate" refers to the solution retained on the retentate side of the membrane and containing the molecules that are too large to pass through the membrane, such as the impurities in step (a) of the present invention, or the protein of interest in step (b) of the present invention.

For conciseness, the acronyms "UF", "DF" and "UF/DF" (or "UFDF") may be used across the description and should be understood as follows: "UF" means "ultrafiltration, "DF" means "diafiltration" and "UF/DF" (or "UFDF") means "ultrafiltration/diafiltration".

"Tangential flow filtration" ("TEF") or "cross flow filtration" refers to filtration in which the feed stream passes parallel to the membrane face as one portion passes through the membrane (permeate) while the remainder (retentate) is recirculated back to the feed reservoir. It is often used instead of "Normal Flow Filtration," ("NFF"), wherein the feed stream is applied perpendicular to the membrane. TFF is preferred, since NFF may cause compression of the mixture at the membrane causing insufficient separation.

As used herein, "filtrate" (also designated herein sometimes as "permeate") is the sample that has flowed through the membrane.

As used herein "recovery" relates to the amount of protein (amount, mass or activity) recovered after processing, e.g. after filtrating, compared to the amount in the starting sample, e.g. before filtrating. Recovery is usually expressed herein as a percentage of the starting material.

The present inventors have demonstrated the scalability of the method of the invention, by using 2 L, 10 L, 100 L and even 2000 L starting material (cf. Examples). The person skilled in the art will appreciate that the method of the invention can be further scaled-up or scaled-down according to the need. As used herein, "membrane loading" is defined as the amount of protein of interest that is loaded on a filtration step divided by the area of the filter (membrane). This parameter can be used for scale-up and scale-down of the filtration steps such that the scaling approach involves keeping membrane loading identical.

The present invention uses a precipitation and washing step to further reduce contaminants (cf. step (c) of the present invention).

The person skilled in the art is acquainted with the underlying mechanism of precipitation, which is to alter the solvation potential of the solvent, more specifically, by lowering the solubility of the solute, i.e. the protein of interest, by addition of a precipitant.

In general, protein precipitate formation ("precipitation") occurs in a stepwise process. First, a precipitation solution containing the precipitating agent ("precipitant") is added and the solution is steadily mixed. Mixing causes the precipitant and protein to collide. Next, the proteins undergo a nucleation phase, where submicroscopic sized protein aggregates, or particles, are generated. During the final step, the protein precipitate particles repeatedly collide and stick, then break apart, until a stable mean protein particle size is reached ("aging"). The mechanical strength of the protein particles correlates with the product of the mean shear rate and the aging time, which is known as the Camp number. Aging helps the insoluble solid protein particles (precipitate) withstand the fluid shear forces encountered in pumps and centrifuge feed zones without reducing in size.

As used herein, "precipitate" refers to the insoluble solid comprising the target protein. The precipitate may emerge as a suspension. As used herein, "precipitant" refers to any chemical that causes a solid to form in a liquid solution.

Any suitable method for precipitation can be used in the present method, such as, isoelectric precipitation, precipitation with miscible solvents, precipitation via non-ionic hydrophilic polymers, precipitation via polyvalent metallic ions, such as $Ca^{2+}$, $Mg^{2+}$, $Mn^{2+}$ or $Fe^{2+}$, and precipitation via salting out, preferably via salting out.

The protein of the invention can be precipitated by Salt Induced Precipitation ("Salting Out"), which is the most common method used to precipitate a protein. Addition of a neutral salt compresses the solvation layer and increases protein-protein interactions. As the salt concentration of a solution is increased, the charges on the surface of the protein interact with the salt, not the water, thereby exposing hydrophobic patches on the protein surface and causing the protein to fall out of solution (aggregate and precipitate). Preferred neutral salts are kosmotropes or "water structure stabilizers", which promote the dissipation/dispersion of water from the solvation layer around a protein. Preferred neutral salts are combinations of $(PO_4)^{3-}$, $(SO_4)^{2-}$, $SOO^-$, and $Cl^-$, with $(NH_4)^+$, $K^+$ and $Na^+$, most preferably the salt is $((NH_4)^+)_2(SO_4)^{2-}$.

The protein of the invention can also be precipitated by Isoeletric Precipitation, for instance with Trichloroacetic Acid. For instance, precipitation can be achieved by varying the pH of the medium. At low pH's, proteins have a net positive charge because the amide gains an extra proton. At high pH's, they have a net negative charge due to the carboxyl on the protein backbone losing its proton. At their pI value, a protein has no net charge. This leads to reduced solubility because the protein is unable to interact with the medium and will then fall out of solution. Trichloroacetic Acid (TCA) is commonly used for precipitation because it sees great results with a relatively low concentration (typically around ~15%). Organic solvents, such as acetone, can also be used for protein precipitation, often in conjunction with TCA. The organic solvents decrease the dielectric constant of an organic solvent resulting in a loss of solubility and therefore precipitation.

To further reduce the amount of impurities, the precipitate can be washed with a "washing solution". In order to maximize yield, this wash step requires that the precipitate remains precipitated, e.g. the precipitate is not, or only substantially not resuspended. On the other hand, it is preferred that the wash step does not aggregate additional compounds, such as impurities. The person skilled in the art will be able to choose appropriate washing solution for this wash step, including assessing e.g. ionic strength, molarity, etc. Preferred washing solutions are identical or similar to the solutions used for precipitation, such as, e.g. solutions comprising miscible solvents, non-ionic hydrophilic polymers, polyvalent metallic ions, or neutral salts, preferably neutral salts.

Preferably, the washing solution comprises a neutral salt, more preferably $((NH_4)^+)_2(SO_4)^{2-}$, preferably at a concentration of between 1.6 to 2.0 M, even more preferably at 1.8 M.

For further manipulations of the protein of interest, it is preferred to dissolve the protein or bring the protein into solution. As used herein, "resuspending" refers to dissolving the solute, i.e. the protein of interest in a solvent, i.e. the resuspension solution. The resulting solution comprises the resuspended product. Again, the person skilled in the art is wholly knowledgeable about suitable resuspension solutions and how to apply these. For instance, lowering the concentration of the washing solution used for the wash step by adding purified water can already dissolve the precipitated protein. In a preferred embodiment, the concentration of the neutral salt, such as e.g. $((NH_4)^+)_2(SO_4)^{2-}$, is lowered to about 0.4 M to about 0.8 M, preferably to about 0.6 M.

The terms "protein", "peptide", "protein/peptide", and "polypeptide" are used interchangeably throughout the disclosure and each has the same meaning for purposes of this disclosure. Each term refers to an organic compound made of a linear chain of two or more amino acids. The compound may have ten or more amino acids; twenty-five or more amino acids; fifty or more amino acids; one hundred or more amino acids, two hundred or more amino acids, and even three hundred or more amino acids. The skilled artisan will appreciate that polypeptides generally comprise fewer amino acids than proteins, although there is no art-recognized cut-off point of the number of amino acids that distinguish a polypeptide and a protein; that polypeptides may be made by chemical synthesis or recombinant methods; and that proteins are generally made in vitro or in vivo by recombinant methods as known in the art. The term "protein" as used herein refers to molecules having the sequence of native proteins, that is, proteins produced by naturally-occurring and specifically non-recombinant cells, or genetically-engineered or recombinant cells, and comprise molecules having the amino acid sequence of the native protein, or molecules, having deletions from, additions to, and/or substitutions of one or more amino acids of the native sequence. In certain aspects, the protein to be purified is an antibody. As intended herein, the term "protein" includes both "polypeptide", "immunoglobulin", "antibody" and "antibody fragments."

Unless indicated otherwise, the terms "immunoglobulin" and "immunoglobulin sequence"—whether used herein to refer to a heavy chain antibody or to a conventional 4-chain antibody—is used as a general term to include both the full-size antibody, the individual chains thereof, as well as all parts, domains or fragments thereof (including but not limited to antigen-binding domains or fragments such as VHH domains or $V_H/V_L$ domains, respectively).

The term "antibody" as used herein refers to an intact antibody, or a binding fragment thereof that competes with the intact antibody for specific binding. Binding fragments include, but are not limited to, F(ab), F(ab'), F(ab')2, Fv, and single-chain antibodies.

The term "domain" (of a polypeptide or protein) as used herein refers to a folded protein structure which has the ability to retain its tertiary structure independently of the rest of the protein. Generally, domains are responsible for discrete functional properties of proteins, and in many cases may be added, removed or transferred to other proteins without loss of function of the remainder of the protein and/or of the domain.

The term "immunoglobulin domain" as used herein refers to a globular region of an antibody chain (such as e.g., a chain of a conventional 4-chain antibody or of a heavy chain antibody), or to a polypeptide that essentially consists of such a globular region. Immunoglobulin domains are characterized in that they retain the immunoglobulin fold characteristic of antibody molecules, which consists of a two-layer sandwich of about seven antiparallel beta-strands arranged in two beta-sheets, optionally stabilized by a conserved disulphide bond.

The term "immunoglobulin variable domain" as used herein means an immunoglobulin domain essentially consisting of four "framework regions" which are referred to in the art and herein below as "framework region 1" or "FR1"; as "framework region 2" or "FR2"; as "framework region 3" or "FR3"; and as "framework region 4" or "FR4", respectively; which framework regions are interrupted by three "complementarity determining regions" or "CDRs", which are referred to in the art and herein below as "complementarity determining region 1" or "CDR1"; as "complementarity determining region 2" or "CDR2"; and as "complementarity determining region 3" or "CDR3", respectively. Thus, the general structure or sequence of an immunoglobulin variable domain can be indicated as follows: FR1-CDR1-FR2-CDR2-FR3-CDR3-FR4. It is the ISVD(s) that confer specificity to an antibody for the antigen by carrying the antigen-binding site, and in particular CDR1, CDR2 and/or CDR3.

The term "immunoglobulin single variable domain" ("ISV" or "ISVD"), interchangeably used with "single variable domain", defines molecules wherein the antigen binding site is present on, and formed by, a single immunoglobulin domain. This sets ISVs apart from "conventional" immunoglobulins or their fragments, wherein two immunoglobulin domains, in particular two variable domains, interact to form an antigen binding site. Typically, in conventional immunoglobulins, a heavy chain variable domain (VH) and a light chain variable domain (VL) interact to form an antigen binding site. In this case, the complementarity determining regions (CDRs) of both VH and VL will contribute to the antigen binding site, i.e. a total of 6 CDRs will be involved in antigen binding site formation.

In view of the above definition, the antigen-binding domain of a conventional 4-chain antibody (such as an IgG, IgM, IgA, IgD or IgE molecule; known in the art) or of a Fab fragment, a F(ab')2 fragment, an Fv fragment such as a disulphide linked Fv or a scFv fragment, or a diabody (all known in the art) derived from such conventional 4-chain antibody, would normally not be regarded as an ISV, as, in these cases, binding to the respective epitope of an antigen would normally not occur by one (single) immunoglobulin domain but by a pair of (associating) immunoglobulin domains such as light and heavy chain variable domains, i.e., by a VH-VL pair of immunoglobulin domains, which jointly bind to an epitope of the respective antigen.

In contrast, ISVs are capable of specifically binding to an epitope of the antigen without pairing with an additional immunoglobulin variable domain. The binding site of an ISV is formed by a single VH, a single VHH or a single VL domain. Hence, the antigen binding site of an ISV is formed by no more than three CDRs.

As such, the single variable domain may be a light chain variable domain sequence (e.g., a VL-sequence) or a suitable fragment thereof; or a heavy chain variable domain sequence (e.g., a VH-sequence or VHH sequence) or a suitable fragment thereof; as long as it is capable of forming a single antigen binding unit (i.e., a functional antigen binding unit that essentially consists of the single variable domain, such that the single antigen binding domain does not need to interact with another variable domain to form a functional antigen binding unit).

In one embodiment of the invention, the ISVs are heavy chain variable domain sequences (e.g., a VH-sequence); more specifically, the ISVs can be heavy chain variable domain sequences that are derived from a conventional four-chain antibody or heavy chain variable domain sequences that are derived from a heavy chain antibody.

For example, the ISV may be a (single) domain antibody, an amino acid that is suitable for use as a (single) domain antibody, an immunoglobulin that is suitable for use as a (single) domain antibody, a "dAb" or dAb, or an amino acid that is suitable for use as a dAb, or a Nanobody (as defined herein, and including but not limited to a VHH); a humanized VHH sequence, a camelized VH sequence, a VHH sequence that has been obtained by affinity maturation, other single variable domains, an immunoglobulin single heavy chain variable domain or any suitable fragment of any one thereof.

In particular, the ISV may be a Nanobody® (as defined herein) or a suitable fragment thereof. [Note: Nanobody® and Nanobodies® are registered trademarks of Ablynx N.V.] For a general description of Nanobodies, reference is made to the further description below, as well as to the prior art cited herein, such as e.g. described in WO 08/020079 (page 16).

"VHH domains", also known as VHHs, $V_HH$ domains, VHH antibody fragments, and VHH antibodies, have originally been described as the antigen binding immunoglobulin (variable) domain of "heavy chain antibodies" (i.e., of "antibodies devoid of light chains"; Hamers-Casterman et al. Nature 363: 446-448, 1993). The term "VHH domain" has been chosen in order to distinguish these variable domains from the heavy chain variable domains that are present in conventional 4-chain antibodies (which are referred to herein as "$V_H$ domains" or "VH domains") and from the light chain variable domains that are present in conventional 4-chain antibodies (which are referred to herein as "V$_L$ domains" or "VL domains"). For a further description of VHH's and Nanobodies, reference is for instance made to the review article by Muyldermans (Reviews in Molecular Biotechnology 74: 277-302, 2001) as well as WO 04/041867, WO 04/041862, WO 04/041865, WO 04/041863, WO 04/062551, WO 05/044858, WO 06/40153, WO 06/079372, WO 06/122786, WO 06/122787 and WO 06/122825, by Ablynx N.V. and the further published patent applications by Ablynx N.V. Reference is also made to the further prior art mentioned in these applications, and in particular to the list of references mentioned on pages 41-43 of the International application WO 06/040153, which list and references are incorporated herein by reference. As described in these references, ISVs, Nanobodies (in particular VHH sequences and partially humanized Nanobodies) can in particular be characterized by the presence of one or more "Hallmark residues" in one or more of the framework sequences. A further description of the ISVs, Nanobodies, including humanization and/or camelization of Nanobodies, as well as other modifications, parts or fragments, derivatives or "Nanobody fusions", multivalent constructs (including some non-limiting examples of linker sequences) and different modifications to increase the half-life of the ISVs, Nanobodies and their preparations can be found e.g. in WO 08/101985 and WO 08/142164. For a further general description of Nanobodies, reference is made to the prior art cited herein, such as e.g., described in WO 08/020079 (page 16).

"Domain antibodies", also known as "Dab"(s), "Domain Antibodies", and "dAbs" (the terms "Domain Antibodies" and "dAbs" being used as trademarks by the GlaxoSmithKline group of companies) have been described in e.g., EP 0368684, Ward et al. (Nature 341: 544-546, 1989), Holt et al. (Tends in Biotechnology 21: 484-490, 2003) and WO 03/002609 as well as for example WO 04/068820, WO 06/030220, WO 06/003388 and other published patent applications of Domantis Ltd. Domain antibodies essentially correspond to the VH or VL domains of non-camelid mammalians, in particular human 4-chain antibodies. In order to bind an epitope as a single antigen binding domain, i.e., without being paired with a VL or VH domain, respectively, specific selection for such antigen binding properties is required, e.g. by using libraries of human single VH or VL domain sequences. Domain antibodies have, like VHHs, a molecular weight of approximately 13 to approximately 16 kDa and, if derived from fully human sequences, do not require humanization for e.g. therapeutic use in humans.

For example, and without limitation, one or more ISVs may be used as a "binding unit", "binding domain" or "building block" (these terms are used interchangeable) for the preparation of a polypeptide, which may optionally contain one or more further ISVs that can serve as a binding unit (i.e., against the same or another epitope and/or against one or more other antigens, proteins or targets).

A method for preparing multivalent polypeptides comprising more than one ISV may comprise at least the steps of linking two or more ISVs of the invention and for example one or more linkers together in a suitable manner. The ISVs of the invention (and linkers) can be coupled by any method known in the art and as further described herein. Preferred techniques include the linking of the nucleic acid sequences that encode the ISVs of the invention (and linkers) to prepare a genetic construct that expresses the multivalent polypeptide. Techniques for linking amino acids or nucleic acids will be clear to the skilled person, and reference is again made to the standard handbooks, such as Sambrook et al. and Ausubel et al., mentioned above, as well as the examples below.

In a preferred embodiment, the protein of interest is a polypeptide comprising one or more, such as 2 or 3 VHHs.

The protein of interest can be expressed and secreted in any suitable host cells. Suitable hosts or host cells will be clear to the skilled person, and may for example be any suitable fungal, prokaryotic or eukaryotic cell or cell line or any suitable fungal, prokaryotic or (non-human) eukaryotic organism, for example:

a bacterial strain, including but not limited to gram-negative strains such as strains of *Escherichia coli*; of *Proteus*, for example of *Proteus mirabilis*; of *Pseudomonas*, for example of *Pseudomonas fluorescens*; and gram-positive strains such as strains of *Bacillus*, for example of *Bacillus subtilis* or of *Bacillus brevis*; of *Streptomyces*, for example of *Streptomyces lividans*; of *Staphylococcus*, for example of *Staphylococcus carnosus*; and of *Lactococcus*, for example of *Lactococcus lactis;* a fungal cell, including but not limited to cells from species of *Trichoderma*, for example from *Trichoderma reesei*; of *Neurospora*, for example from *Neurospora crassa*; of *Sordaria*, for example from *Sordaria macrospora*; of *Aspergillus*, for example from *Aspergillus niger* or from *Aspergillus sojae*; or from other filamentous fungi;

a yeast cell, including but not limited to cells from species of *Saccharomyces*, for example of *Saccharomyces cerevisiae*; of *Schizosaccharomyces*, for example of *Schizosaccharomyces pombe*; of *Pichia*, for example of *Pichia pastoris* or of *Pichia methanolica*; of *Hansenula*, for example of *Hansenula polymorpha*; of *Kluyveromyces*, for example of *Kluyveromyces lactis*; of *Arxula*, for example of *Arxula adeninivorans*; of *Yarrowia*, for example of *Yarrowia lipolytica;* an amphibian cell or cell line, such as *Xenopus oocytes;* an insect-derived cell or cell line, such as cells/cell lines derived from lepidoptera, including but not limited to *Spodoptera* SF9 and Sf21 cells or cells/cell lines derived from *Drosophila*, such as Schneider and Kc cells;

a plant or plant cell, for example in tobacco plants; and/or a mammalian cell or cell line, for example a cell or cell line derived from a human, a cell or a cell line from mammals including but not limited to CHO-cells (for example CHO-K1 cells), BHK-cells and human cells or cell lines such as HeLa, COS, Caki and HEK293H cells; as well as all other host cells or (non-human) hosts known per se for the expression and production of antibodies and antibody fragments (including but not limited to (single) domain antibodies and ScFv fragments), which will be clear to the skilled person. Reference is also made to the general background art cited hereinabove, as well as to for example WO 94/29457; WO 96/34103; WO 99/42077; Frenken et al. (Res Immunol. 149: 589-99, 1998); Riechmann and Muyldermans (1999), supra; van der Linden (J. Biotechnol. 80: 261-70, 2000); Joosten et al. (Microb. Cell Fact. 2: 1, 2003); Joosten et al. (Appl. Microbiol. Biotechnol. 66: 384-92, 2005); and the further references cited therein.

To produce/obtain expression of the proteins of the invention, the host cell or host organism may generally be kept, maintained and/or cultured under conditions such that the (desired) polypeptide of the invention is expressed/produced. Suitable conditions will be clear to the skilled person and will usually depend upon the host cell/host organism used, as well as on the regulatory elements that control the expression of the protein of the invention.

The method of the present invention for purifying a protein from solution relies on various filtration steps, in which inter alia the protein of interest is separated from larger impurities (step (a) of the method), and the protein of interest is separated from smaller impurities; (step (b) of the method). The person skilled in the art will realize that the nominal size of the protein may necessitate adjustment of the MWCO of the membrane used in the various steps. For instance, an intact IgG antibody with a size of about 150 kDa may necessitate different first and second membranes than a VHH with a 10-fold smaller size. With the teaching of the invention in mind, the person skilled in the art can instantly adjust the pore size of the membranes according to the protein of interest.

Preferably, the protein of interest is smaller than 50 kDa, for instance, a polypeptide comprising 1, 2 or 3 VHHs, with a size of about 13-16 kDa, 26-32 kDa or 39-48 kDa, respectively, even more preferably a polypeptide comprising 1 VHH with a size up to about 20 kDa, more preferably of about 13-16 kDa.

The method disclosed herein is intended to purify proteins from solution. As used herein, "purified" and "to purify" refers to an eventual purity that allows for the effective use of the protein in vitro, ex vivo, or in vivo. For a protein to be useful in in vitro, ex vivo, or in vivo applications, it should be substantially free of impurities, such as, for instance, contaminants, other proteins, host cells, product-related variants and/or chemicals, that could interfere with the use of that protein in such applications, or that at least would be undesirable for inclusion with the protein of interest. Such applications include the preparation of therapeutic compositions, the administration of the protein in a therapeutic composition, and other methods disclosed herein. Preferably, a "purified" protein, as referenced herein, is a protein that has been purified from impurities or other protein components such that the protein of interest comprises at least about 80% weight/weight of the total protein in a given composition, and more preferably, at least about 85%, and more preferably at least about 90%, and more preferably at least about 91%, and more preferably at least about 92%, and more preferably at least about 93%, and more preferably at least about 94%, and more preferably at least about 95%, and more preferably at least about 96%, and more preferably at least about 97%, and more preferably at least about 98%, and more preferably at least about 99% weight/weight of the total protein in a given composition.

The target protein, as well as contaminating proteins that may be present in a sample, can be monitored by any appropriate means. As such, purity can be determined by routine methods known in the art or described in the Examples section, such as, for example, electrophoretic (e.g., SDS-PAGE, isoelectric focusing (IEF), capillary electrophoresis) or chromatographic (e.g., ion exchange or reverse phase HPLC). For review of the methods for assessment of protein purity, see, e.g., Flatman et al, J. Chromatogr. B 848:79-87 (2007). Preferably, the technique should be sensitive enough to detect contaminants in the range between about 2 parts per million (ppm) (calculated as nanograms per milligram of the protein being purified) and 500 ppm. For example, enzyme-linked immunosorbent assay (ELISA), a method well known in the art, may be used to detect contamination of the protein by the second protein. See e.g. Reen (1994), Enzyme-Linked Immunosorbent Assay (ELISA), in Basic Protein and Peptide Protocols, Methods Mol. Biol. 32: 461-466, which is incorporated herein by reference in its entirety. In one aspect, contamination of the protein by such other proteins can be reduced after the methods described herein, preferably by at least about two-fold, more preferably by at least about three-fold, more preferably by at least about five-fold, more preferably by at least about ten-fold, more preferably by at least about twenty-fold, more preferably by at least about thirty-fold, more preferably by at least about forty-fold, more preferably by at least about fifty-fold, more preferably by at least about sixty-fold, more preferably by at least about seventy-fold, more preferably by at least about 80-fold, more preferably by at least about 90-fold, and most preferably by at least about 100-fold.

In another aspect, contamination of the protein by such other proteins after the methods described herein is not more than about 10,000 ppm, preferably not more than about 2500 ppm, more preferably not more than about 400 ppm, more preferably not more than about 360 ppm, more preferably not more than about 320 ppm, more preferably not more than about 280 ppm, more preferably not more than about 250 ppm. Such contamination can range from undetectable levels to about 10 ppm or from about 10 ppm to about 10,000 ppm. If a protein of interest is being purified for pharmacological use, one of skill in the art will realize that the preferred level of the second, contaminating protein can depend on the weekly dose of the protein of interest to be administered per patient, with the aim that the patient will not receive more than a certain amount of a contaminating protein per week.

The amount of DNA that may be present in a sample of the protein being purified can be determined by any suitable method. For example, one can use an assay utilizing polymerase chain reaction (cf. Examples section). Optionally, the technique can detect DNA contamination at levels of 10 picograms per milligram of protein and greater. DNA levels can be reduced by HIC (hydrophobic-interaction chromatography), optionally by about two-fold, preferably by about five-fold, more preferably by about ten-fold, more preferably by about fifteen-fold, most preferably by about 20-fold. Optionally, levels of DNA after HIC, such as hydroxyapatite chromatography, are less than about 20 picograms per milligram of protein, preferably less than 15 picograms per milligram of protein, more preferably less than 10 picograms per milligram of protein, most preferably less than 5 picograms per milligram of protein.

The term "protein formulation" (also indicated herein as "formulation") designates the final product including the protein of interest, the primary buffer and optionally excipients. When referring to proteins intended for a therapeutic use, the term "Drug Substance" may be used instead of "protein formulation" and the protein of interest may be designated by the term "active ingredient" or "product". As used herein a "primary buffer" is any buffer suitable for further processing or use, whether or not excipients are added. In general, the primary buffer has a pH of 5.0 to 7.5, and is suitable for administration. The "excipients" are defined by all the constituents of the "protein formulation", which are not the "protein" or "active ingredient". The excipients typically include lyoprotectants; surfactants; bulking agents; tonicity adjusting agents; stabilizers; and preservatives.

In preferred embodiments, the primary buffer includes, but is not limited to phosphate buffers, Tris buffers, acetate buffers, histidine buffers, HEPES buffers and/or citrate buffers, preferably citrate buffers. Acceptable salts may include, but are not limited to sodium chloride, ammonium chloride, potassium chloride, sodium acetate, ammonium acetate, sodium sulfate, ammonium sulfate, ammonium thiocyanate, sodium citrate, sodium phosphate, and potassium, magnesium, and calcium salts thereof, and combinations of these salts. The concentration of the phosphate buffer, Tris buffer, acetate buffer, histidine buffer, HEPES buffer and/or citrate buffer is about 5 mM to about 50 mM, about 5 mM to about 40 mM, about 5 mM to about 30 mM, about 10 mM to about 20 mM, or about 10 mM, about 20 mM, or about 30 mM. In other embodiments, the buffer in the formulation is a Tris buffer present at a concentration of less than about 5 mM to about 50 mM, about 5 mM to about 40 mM, about 5 mM to about 30 mM, about 10 mM to about 20 mM, or about 10 mM, about 20 mM, or about 30 mM. The pH of the buffers of the formulation is generally between about 5 and 7. In some specific embodiments, the pH of the buffer of the formulation is about 5 to about 7.5, about 5.5 to about 7.2. For example, the pH of the buffer can be about 5, 5.5, 5.8-6.1, 6, 6.1, 6.5 or 7. Preferably, the primary buffer is a 20 mM citrate buffer pH 6.0.

In certain embodiments, the protein, e.g., the Nanobody or polypeptide comprising 1, 2 or 3 VHHs in the "protein formulation" is at a concentration of about 0.5 mg/mL to about 350 mg/mL, about 0.5 mg/mL to about 300 mg/mL, about 0.5 mg/mL to about 250 mg/mL, about 0.5 mg/mL to about 150 mg/mL, about 1 mg/ml to about 130 mg/mL, about 10 mg/ml to about 130 mg/mL, about 50 mg/ml to about 120 mg/mL, about 80 mg/ml to about 120 mg/mL, about 88 mg/ml to about 100 mg/mL or about 10 mg/ml, about 25 mg/ml, about 50 mg/ml, about 80 mg/ml, about 100 mg/mL, about 130 mg/ml, about 150 mg/ml, about 200 mg/ml, about 250 mg/ml or about 300 mg/ml.

In other embodiments, the lyoprotectant of the formulation is a sugar, e.g., sucrose, sorbitol, or trehalose. For example, the lyoprotectant can be sucrose, sorbitol, or trehalose at a concentration about 2.5% to about 10%, about 5% to about 10%, about 5% to about 8%, or about 4%, about 4.5%, about 5%, about 5.5%, about 6%, about 6.5%, about 7%, about 7.5%, about 8%, about 8.5%, or about 9% (weight/volume).

In some embodiments, the formulation includes a surfactant at a concentration of about 0.001% to 0.6%, e.g., about 0.01% to 0.6%, about 0.1% to 0.6%, about 0.1% to 0.5%, about 0.1% to 0.4%, about 0.1% to 0.3%, about 0.1% to 0.2%, or about 0.01% to 0.02%. In some cases, the formulation contains greater than 0% and up to about 0.6% {e.g., about 0.1% to 0.2% of polysorbate-20, polysorbate-40, polysorbate-60, polysorbate-65, polysorbate-80 polysorbate-85, poloxamer-188, sorbitan mono-laurate, sorbitan monopalmitate, sorbitan monostearate, sorbitan monooleate, sorbitan trilaurate, sorbitan tristearate, sorbitan trioleaste, or a combination thereof. In specific embodiments, the formulation contains about 0.001%, 0.002%, 0.003%, 0.004%, 0.005%, 0.006%, 0.007%, 0.008%, 0.009%, 0.01% to 0.02%, 0.01%, 0.02%, 0.03%, 0.04%, 0.05%, 0.06%, 0.07%, 0.08%, 0.09%, 0.1%, 0.1% to 0.2%, 0.11%, 0.12%, 0.13%, 0.14%, 0.15%, 0.16%, 0.17%, 0.18%, 0.19% or 0.2% of polysorbate-80. Alternatively, the formulation can include poloxamer-188 at about 0.01% to 0.6%, about 0.1% to 0.6%, about 0.1% to 0.5%, about 0.1% to 0.4%, about 0.1% to 0.3%, or about 0.1% to 0.2%.

In certain embodiments, the formulation includes a bulking agent, e.g., glycine, at a concentration from about 10 to about 200 mM, from about 25 to about 175 mM, from about 50 to about 150 mM, from about 75 to about 125 mM, or about 100 mM.

In other embodiments, the formulation further includes a tonicity adjusting agent, e.g., a molecule that renders the formulation substantially isotonic or isoosmotic with human blood. Exemplary tonicity adjusting agents include sucrose, sorbitol, glycine, methionine, mannitol, dextrose, inositol, sodium chloride, arginine and arginine hydrochloride.

In yet other embodiments, the formulation additionally includes a stabilizer, e.g., a molecule which, when combined with a protein of interest substantially prevents or reduces chemical and/or physical instability of the protein of interest in lyophilized, liquid or storage form. Exemplary stabilizers include sucrose, sorbitol, glycine, inositol, sodium chloride, methionine, arginine, and arginine hydrochloride. In certain embodiments, the formulation includes a stabilizer in one or more of the following ranges: Sucrose from about 1% to about 12% (e.g., about 5%, about 7.5%, about 8% or about 10%); sorbitol from about 1% to about 7% (e.g., about 3%, about 4%, about 5%); inositol from about 1% to about 5%; glycine from about 10 mM to about 125 mM (e.g., about 25 mM to 100 mM, about 80 mM, about 90 mM, or about 100 mM); sodium chloride from about 10 mM to 150 mM (e.g., about 25 mM to 100 mM, about 55 mM); methionine from about 10 mM to about 100 mM (e.g., about 10 mM, about 20 mM, about 100 mM); arginine from about 10 mM to about 125 mM (e.g., about 25 mM to about 120 mM, or about 100 mM); arginine hydrochloride from about 10 mM to about 70 mM (e.g., about 10 mM to about 65 mM, or about 55 mM).

In other embodiments, the formulation may further include methionine, at a concentration from about 10 to about 200 mM, from about 25 to about 175 mM, from about 50 to about 150 mM, from about 75 to about 125 mM, or about 100 mM.

In one embodiment, a component of the formulation can function as one or more of a lyoprotectant, a tonicity adjusting agent and/or a stabilizer. For example, depending on the concentration of a component, e.g., sucrose, it can serve as one or more of a lyoprotectant, a tonicity adjusting agent and/or a stabilizer. In other embodiments where several of the components are required in a formulation, different components are used. For example, where the formulation requires a lyoprotectant, a tonicity adjusting agent and a stabilizer, different components are used (e.g., sucrose, glycine and inositol can be used in combination resulting in a combination of a lyoprotectant, a tonicity adjusting agent and a stabilizer, respectively).

Preferably, the protein formulation is stable. A "stable" formulation is one in which the protein therein essentially retains its physical and chemical stability and integrity upon storage. Various analytical techniques for measuring protein stability are available in the art and are reviewed in Peptide and Protein Drug Delivery, 247-301, Vincent Lee Ed., Marcel Dekker, Inc., New York, N.Y., Pubs. (1991), and Jones, A. Adv. Drug Delivery Rev. 10: 29-90 (1993). Stability can be measured at a selected temperature for a selected time period. For rapid screening, the formulation may be kept at 40° C. for 2 weeks to 1 month, at which time stability is measured. Where the formulation is to be stored at 2-8° C., generally the formulation should be stable at 30° C. or 40° C. for at least 1 month and/or stable at 2-8° C. for at least 2 years. In other embodiments, stability of the protein formulation may be measured using a biological activity assay.

The process of the invention can be used in combination with other protein purification methodologies, such as affinity chromatography, hydroxyapatite chromatography, reverse phase liquid chromatography, ion-exchange chromatography, or any other commonly used protein purification technique. It is contemplated, however, that the process of the present invention will eliminate or significantly reduce the need for other purification steps.

In a particularly embodiment, the present invention relates to a method for purifying a protein from solution comprising:

(a) a first filtration step;
(b) a second filtration step;
(c) a precipitation, wash and resuspension step;
(d) an Ultrafiltration/Diafiltration (UF/DF) step; and
(e) optionally a formulation and final filtration step, wherein said protein has a molecular weight (MW) of between 5 kDa-200 kDa, preferably said protein has a MW of between 10 kDa and 150 kDa, preferably between 12 kDa and 100 kDa, even more preferably between 12 and 45 kDa, such as between 12 and 30 kDa, such as about 12 to 15 kDa, 24-30 kDa, 36-45 kDa or about 20 kDa.

In an embodiment, the present invention relates to a method for purifying a protein from solution as described herein, wherein said first filtration step (a) comprises: (i) passing said solution through a first membrane, resulting in a first permeate comprising said protein; and (ii) optionally, filtering the first permeate comprising said protein, preferably said first membrane has a pore size of between 40 kDa and 100 kDa, preferably between 40 kDa and 80 kDa, even more preferably 50 kDa, nominal molecular weight cut-off (NMWCO). It will be appreciated that in the first filtration step, the NMWCO of the first membrane is larger than the nominal molecular weight (NMW) of the protein to be purified.

The solution comprising the protein of interest is preferably 3-20 g/L cell broth, such as 4-15 g/L, or 5-12 g/L or 6-10 g/L, or 7 g/L or 8 g/L or 9 g/L cell broth, when applying to the first filtration step.

In an embodiment, the present invention relates to a method for purifying a protein from solution as described herein, wherein said first membrane comprises regenerated cellulose, polypropylene, cellulose acetate, polylactic acid, ceramic, polyether-sulfone, modified polyether-sulfone (mPES), polyarylsulphones, polysulfone, polyimide, polyamide, polyvinylidenedifluoride (PVDF).

In an embodiment, the present invention relates to a method for purifying a protein from solution as described herein, wherein said first filtration step is effected by tangential flow filtration (TFF) or by normal flow filtration (NFF), preferably TFF, preferably using purified water, preferably at a transmembrane pressure (TMP) of between 0.25-1.75 bar, such as 0.5-1.5 bar, 0.75-1.25 bar or about 1.0 bar, preferably comprising filtrating between 2-4 Diafiltrating Volumes (DV), such as 2 or 3 DV.

In an embodiment, the present invention relates to a method for purifying a protein from solution as described herein, wherein between 50%-100% of said protein is recovered in the first permeate, such as between 60%-100%, or even between 80%-100%.

In an embodiment, the present invention relates to a method for purifying a protein from solution as described herein, wherein said first permeate comprising said protein comprises 10%-100% less impurities than said solution, such as 20%-100%, 30%-100%, 40%-100%, 50%-100%, 60%-100%, 70%-100%, or even 80%-100% less impurities than said solution, such as less than 85% less impurities than said solution.

In an embodiment, the present invention relates to a method for purifying a protein from solution as described herein, wherein said protein is purified by between 10%-100%, such as 20%-100%, 30%-100%, 40%-100%, 50%-100%, 60%-100%, 70%-100%, or even between 80%-100% in said first permeate compared to said solution.

In an embodiment, the present invention relates to a method for purifying a protein from solution as described herein, wherein said first permeate comprising said protein is filtered through a 0.2 µm filter, preferably between 1000 L-2000 L first permeate volume/m², such as 1500 L/m², and optionally stored at room temperature (RT) for up to 72 h.

In an embodiment, the present invention relates to a method for purifying a protein from solution as described herein, wherein said first filtration step (a) comprises: (i) passing said solution through a first membrane with 2 DV via TFF at a TMP of about 1 bar, using purified water, wherein said first membrane has a pore size of about 50 kDa NMWCO and is made of mPES; resulting in a first permeate comprising said protein; and (ii) optionally, filtering the first permeate comprising said protein through a 0.2 µm filter, at about 1500 L first permeate volume/m².

In an embodiment, the present invention relates to a method for purifying a protein from solution as described herein, wherein said second filtration step (b) comprises: (i) concentrating the first permeate comprising said protein obtained at the end of step (a) using a second membrane, resulting in a first retentate comprising said protein; and (ii) optionally, filtering the first retentate comprising said protein, preferably said second membrane has a pore size of between 2 kDa and 50 kDa, such as between 4 kDa and 40 kDa, between 6 kDa and 30 kDa, between 8 kDa and 20 kDa, more preferably 10 kDa or 15 kDa nominal molecular weight cut-off (NMWCO). It will be appreciated that in the second filtration step, the NMWCO of the second membrane is smaller than the NMW of the protein to be purified.

In an embodiment, the present invention relates to a method for purifying a protein from solution as described herein, wherein said second membrane comprises regenerated cellulose, polypropylene, cellulose acetate, polylactic acid, ceramic, polyether-sulfone, modified polyether-sulfone (mPES), polyarylsulphones, polysulfone, polyimide, polyamide, polyvinylidenedifluoride (PVDF).

In an embodiment, the present invention relates to a method for purifying a protein from solution as described herein, wherein said second filtration step is effected by TFF or by NFF, preferably TFF, preferably using purified water, preferably at a transmembrane pressure (TMP) of between 0.75-1.75 bar, such as 1.0-1.5 bar, or about 1.25 bar.

In an embodiment, the present invention relates to a method for purifying a protein from solution as described herein, wherein the protein in said first retentate is concentrated to a concentration between 50-200 mg/ml, such as 75-175 mg/ml, or between 100-150 mg/ml, such as about 120-125 mg/ml.

In an embodiment, the present invention relates to a method for purifying a protein from solution as described herein, wherein between 50%-100% of said protein is recovered in the first retentate, such as between 60%-100%, or even between 80%-100%.

In an embodiment, the present invention relates to a method for purifying a protein from solution as described herein, wherein said first retentate comprising said protein comprises 10%-100% less impurities than said first permeate comprising said protein, such as 20%-100%, 30%-100%, 40%-100%, 50%-100%, 60%-100%, 70%-100%, or even 80%-100% less impurities than said first permeate comprising said protein.

In an embodiment, the present invention relates to a method for purifying a protein from solution as described herein, wherein said protein is purified by between 10%-100%, such as 20%-100%, 30%-100%, 40%-100%, 50%-100%, 60%-100%, 70%-100%, or even between 80%-100% in said first retentate compared to the protein in said first permeate.

In an embodiment, the present invention relates to a method for purifying a protein from solution as described herein, wherein said first retentate comprising said protein is filtered through a 0.2 µm filter, preferably between 10-75 kg protein/m$^2$, 15-50 kg/m$^2$, such as about 25 kg/m$^2$, and optionally stored at room temperature (RT) for up to 72 h.

In an embodiment, the present invention relates to a method for purifying a protein from solution as described herein, wherein said second filtration step (b) comprises: (i) concentrating the first permeate comprising said protein obtained at the end of step (a) to about 120-125 mg/ml using a second membrane via TFF at about 1.25 bar with purified water, wherein said second membrane has a pore size of about 10 kDa NMWCO and is made of mPES, resulting in a first retentate comprising said protein; and (ii) optionally, filtering the first retentate comprising said protein through a 0.2 µm filter about 25 kg protein/m$^2$.

In an embodiment, the present invention relates to a method for purifying a protein from solution as described herein, wherein said precipitation, wash and resuspension step (c) comprises:
  (i) precipitating said protein in said first retentate obtained at the end of step (b) until a precipitate comprising said protein is formed;
  (ii) washing said precipitate comprising said protein;
  (iii) resuspending the washed precipitate obtained at the end of step (c)(ii), resulting in a second retentate comprising said protein;
  (iv) optionally filtrating the second retentate comprising said protein obtained at the end of step (c)(iii) through a third membrane, resulting in a second permeate comprising said protein; and
  (v) optionally, filtering the second permeate comprising said protein.

In an embodiment, the present invention relates to a method for purifying a protein from solution as described herein, wherein said precipitating step (c)(i), and/or said washing step (c)(ii), and/or said resuspending step (c)(iii), and/or said filtrating step (c)(iv) are effected in a TFF device, preferably all steps (c)(i), (c)(ii), (c)(iii) and (c)(iv) are effected in one and the same device, wherein said TFF device and said NFF device comprises said third membrane, preferably third membrane comprises regenerated cellulose, polypropylene, cellulose acetate, polylactic acid, ceramic, polyether-sulfone, mPES, polyarylsulphones, polysulfone, polyimide, polyamide, polyvinylidenedifluoride (PVDF), more preferably said third membrane has a pore size between 0.05-0.35 µm, such as 0.1-0.3 µm or between 0.15-0.25 µm, such as 0.2 µm, preferably between 10-75 kg protein/m$^2$, 15-50 kg/m$^2$, such as about 20 or 25 kg/m$^2$.

In an embodiment, the present invention relates to a method for purifying a protein from solution as described herein, wherein said precipitating is effected by a precipitation solution comprising a precipitating agent chosen from the group consisting of miscible solvents, non-ionic hydrophilic polymers, polyvalent metallic ions, such as Ca$^{2+}$, Mg$^{2+}$, Mn$^{2+}$ or Fe$^{2+}$, and neutral salts, preferably kosmotropes, most preferably $((NH_4)^+)_2(SO_4)^{2-}$, preferably said precipitating is effected at 1.4-2.2 M, such as 1.6-2.0 M, preferably about 1.8 M $((NH_4)^+)_2(SO_4)^2$.

In an embodiment, the present invention relates to a method for purifying a protein from solution as described herein, wherein said precipitating is effected by mixing the first retentate comprising said protein obtained at the end of step (b) with a solution until a precipitate is formed, preferably said solution is gradually added to said first retentate, more preferably said solution is mixed with said first retentate by stirring, more preferably said solution comprises between 2.8-3.4 M, such as 3.0-3.2 M, preferably about 3.1 M $((NH_4)^+)_2(SO_4)^{2-}$.

In an embodiment, the present invention relates to a method for purifying a protein from solution as described herein, wherein the precipitate has a concentration between 20-80 mg/ml, such as 25-70 mg/ml, or between 30-60 mg/ml, such as about 50 mg/ml.

In an embodiment, the present invention relates to a method for purifying a protein from solution as described herein, wherein washing of said precipitate comprising said protein of step (c)(ii) comprises replacing the precipitation solution by a washing solution, and preferably washing said precipitate with 2-8 DVs, such as 4-6 DV, or 5 DV washing solution.

In an embodiment, the present invention relates to a method for purifying a protein from solution as described herein, wherein said washing step (c)(ii) is effected at a transmembrane pressure (TMP) of between 0.1-1.5 bar, such as 0.2-1.0 bar, 0.3-0.75 bar or about 0.5 bar.

In an embodiment, the present invention relates to a method for purifying a protein from solution as described herein, wherein said washing solution comprises a precipitating agent with a concentration between 1.4-2.2 M, such as 1.6-2.0 M, preferably about 1.8 M, preferably said precipitating agent is $((NH_4)^+)_2(SO_4)^{2-}$, more preferably said washing solution is 1.8 M $((NH_4)^+)_2(SO_4)^{2-}$.

In an embodiment, the present invention relates to a method for purifying a protein from solution as described herein, wherein the washed precipitate obtained at the end of step (c)(ii) is resuspended in a resuspension solution comprising a precipitating agent with concentration between 0.8-0.4 M, such as 0.7-0.5 M, preferably about 0.6 M, preferably said precipitating agent is $((NH_4)^+)_2(SO_4)^{2-}$, more preferably said resuspension solution is 0.6 M $((NH_4)^+)_2(SO_4)^{2-}$.

In an embodiment, the present invention relates to a method for purifying a protein from solution as described herein, wherein between 50%-100% of said protein is recovered in the second permeate, such as between 60%-100%, or even between 80%-100%.

In an embodiment, the present invention relates to a method for purifying a protein from solution as described herein, wherein said second permeate comprising said protein comprises 10%-100% less impurities than said first retentate, such as 20%-100%, 30%-100%, 40%-100%, 50%-100%, 60%-100%, 70%-100%, or even 80%-100% less impurities than said first retentate.

In an embodiment, the present invention relates to a method for purifying a protein from solution as described herein, wherein said protein is purified by between 10%-100%, such as 20%-100%, 30%-100%, 40%-100%, 50%-100%, 60%-100%, 70%-100%, or even between 80%-100% in said second permeate compared to said first retentate.

In an embodiment, the present invention relates to a method for purifying a protein from solution as described herein, wherein said precipitation, wash and resuspension step (c) is effected in a TFF device comprising a third membrane comprising mPES having a pore size of about 20-25 kg/m$^2$, said method comprising:
  (i) precipitating said protein in said first retentate obtained at the end of step (b) until a precipitate comprising said protein is formed; wherein said precipitating is effected by mixing the first retentate comprising said protein obtained at the end of step (b) with a 3.1 M $((NH_4)^+)_2(SO_4)^{2-}$ until a precipitate is formed, wherein said $((NH_4)^+)_2(SO_4)^{2-}$ is gradually added to said first retentate, and mixed with said first retentate by stirring, until a final concentration of about 1.8 M $((NH_4)^+)_2(SO_4)^{2-}$ and 50 mg/ml protein is obtained;
(ii) washing said precipitate comprising said protein with 5 DV washing solution comprising about 1.8 M $((NH_4)^+)_2(SO_4)^{2-}$ at a TMP of about 0.5 bar;
(iii) resuspending the washed precipitate obtained at the end of step (c)(ii) by adding purified water until an end concentration of about 0.6 M $((NH_4)^+)_2(SO_4)^{2-}$ (resuspension solution), resulting in a second retentate comprising said protein; and
(iv) optionally filtrating the second retentate comprising said protein obtained at the end of step (c)(iii) through said third membrane resulting in a second permeate comprising said protein.

In an embodiment, the present invention relates to a method for purifying a protein from solution as described herein, wherein said (d) Ultrafiltration/Diafiltration (UF/DF) steps comprises:
(i) diafiltrating the second permeate comprising said protein obtained at the end of step (c), resulting in a first diafiltrate comprising said protein;
(ii) concentrating the first diafiltrate comprising said protein obtained at the end of step (d)(i), resulting in a third retentate comprising said protein;
(iii) diafiltrating the third retentate comprising said protein of step (d)(ii), resulting in a second diafiltrate comprising said protein;
(iv) optionally, filtering said second diafiltrate comprising said protein.

In an embodiment, the present invention relates to a method for purifying a protein from solution as described herein, wherein said diafiltrating step (d)(i), and/or concentrating step (d)(ii), and/or said diafiltrating step (d)(iii) are effected in a TFF device, preferably all steps (d)(i), (d)(ii) and (d)(iii) are effected in one and the same device, wherein said TFF device and said NFF device comprises a fourth (UF) membrane, preferably said diafiltrating step (d)(i), and/or concentrating step (d)(ii), and/or said diafiltrating step (d)(iii) are effected at a transmembrane pressure (TMP) of between 0.75-1.75 bar, such as 1.0-1.5 bar, or about 1.2 bar, preferably with a primary buffer, such as phosphate buffers, Tris buffers, acetate buffers, histidine buffers, HEPES buffers, preferably at the pH of the primary buffer is about 5 to about 7.5, about 5.5 to about 7.2, such as a pH of about 5, 5.5, 5.8-6.1, 6, 6.1, 6.5 or 7, preferably the concentration of the primary buffer is about 5 mM to about 50 mM, about 5 mM to about 40 mM, about 5 mM to about 30 mM, about 10 mM to about 20 mM, or about 10 mM, about 20 mM, or about 30 mM. In other embodiments, the buffer in the formulation is a Tris buffer present at a concentration of less than about 5 mM to about 50 mM, about 5 mM to about 40 mM, about 5 mM to about 30 mM, about 10 mM to about 20 mM, or about 10 mM, about 20 mM, or about 30 mM, more preferably the primary buffer is 20 mM citrate buffer pH6.0.

In an embodiment, the present invention relates to a method for purifying a protein from solution as described herein, said fourth (UF) membrane comprises regenerated cellulose, polypropylene, cellulose acetate, polylactic acid, ceramic, polyether-sulfone, polyarylsulphones, polysulfone, mPES, poly-imide, polyamide, polyvinylidenedifluoride (PVDF), more preferably said fourth (UF) membrane has a pore size of between 2 kDa and 50 kDa, such as between 4 kDa and 40 kDa, between 6 kDa and 30 kDa, between 8 kDa and 20 kDa, more preferably 10 kDa or 15 kDa nominal molecular weight cut-off (NMWCO). It will be appreciated that in the UF/DF step, the NMWCO of the fourth (UF) membrane is smaller than the NMW of the protein to be purified.

In an embodiment, the present invention relates to a method for purifying a protein from solution as described herein, wherein the second permeate comprising said protein obtained at the end of step (c) is diafiltrated with between 1-4 Diafiltrating Volumes (DV), such as 1 DV, preferably with primary buffer.

In an embodiment, the present invention relates to a method for purifying a protein from solution as described herein, wherein said concentrating step (d)(ii) comprises concentrating said first diafiltrate comprising said protein obtained at the end of step (d)(i) to a third retentate comprising said protein with a concentration between 10-100 mg/ml, such as 25-80 mg/ml, or between 40-60 mg/ml, such as about 50 mg/ml or 55 mg/ml in said primary buffer.

In an embodiment, the present invention relates to a method for purifying a protein from solution as described herein, wherein the third retentate comprising said protein obtained at the end of step (d)(ii) is diafiltrated with 1-8 Diafiltrating Volumes (DV), such as 3-6, or 4 DV or 5 DV, preferably with said primary buffer.

In an embodiment, the present invention relates to a method for purifying a protein from solution as described herein, wherein between 50%-100% of said protein is recovered in said second diafiltrate, such as between 60%-100%, or even between 80%-100%, preferably more than 90% such as more than 95%, compared to the third retentate comprising said protein.

In an embodiment, the present invention relates to a method for purifying a protein from solution as described herein, wherein said second diafiltrate comprising said protein is filtered through a 0.2 µm filter, preferably between 10-75 kg/m$^2$, such as 15-60 kg/m$^2$, 20-50 kg/m$^2$, or about 30 kg/m$^2$ or 40 kg/m$^2$, and optionally stored at room temperature (RT) for up to 72 h.

In an embodiment, the present invention relates to a method for purifying a protein from solution as described herein, wherein said UF/DF step (d) is effected in a TFF device comprising a fourth (UF) membrane comprising mPES with about 10 KDa NMWCO at a TMP of about 1.2 bar, with a primary buffer,
(i) diafiltrating the second permeate comprising said protein obtained at the end of step (c) with 1 DV primary buffer, resulting in a first diafiltrate comprising said protein;
(ii) concentrating the first diafiltrate comprising said protein obtained at the end of step (d)(i) until about 50-55 mg/ml in said primary buffer, resulting in a third retentate comprising said protein;
(iii) diafiltrating the third retentate comprising said protein of step (d)(ii) with 4 or 5 DV primary buffer, resulting in a second diafiltrate comprising said protein; and
(iv) optionally, filtering said second diafiltrate comprising said protein through a 0.2 µm filter at about 30-40 kg/m$^2$.

In an embodiment, the present invention relates to a method for purifying a protein from solution as described herein, wherein said formulation and final filtration step (e) comprises:

(i) formulating said second diafiltrate comprising said protein obtained at the end of step (d), resulting in a protein formulation; and (ii) optionally filtering the protein formulation.

In an embodiment, the present invention relates to a method for purifying a protein from solution as described herein, wherein said formulating step (e)(i) comprises adding excipients to said second diafiltrate comprising said protein.

In an embodiment, the present invention relates to a method for purifying a protein from solution as described herein, wherein said excipients are chosen from lyoprotectants, surfactants, bulking agents, tonicity adjusting agents, stabilizers, and preservatives.

In an embodiment, the present invention relates to a method for purifying a protein from solution as described herein, wherein said protein formulation comprises
- protein at a concentration of 10-100 mg/ml, such as 25-80 mg/ml, or between 40-60 mg/ml, such as about 50 mg/ml or 55 mg/ml protein;
- primary buffer such as phosphate buffers, Tris buffers, acetate buffers, histidine buffers, HEPES buffers, preferably at the pH of the primary buffer is about 5 to about 7.5, preferably the concentration of the primary buffer is about 5 mM to about 50 mM, more preferably the primary buffer is 20 mM citrate, pH 6.0; and
- optionally a stabilizer chosen from the group consisting of sucrose, sorbitol, mannitol, glycine, inositol, sodium chloride, methionine, arginine, and arginine hydrochloride, from about 1-12%, preferably mannitol, preferably 10 mg/ml; and
- optionally a surfactant at a concentration of about 0.001% to 0.6%, chosen from the group consisting of polysorbate-20, polysorbate-40, polysorbate-60, polysorbate-65, polysorbate-80 polysorbate-85, poloxamer-188, sorbitan monolaurate, sorbitan monopalmitate, sorbitan monostearate, sorbitan monooleate, sorbitan trilaurate, sorbitan tristearate, sorbitan trioleaste.

In an embodiment, the present invention relates to a method for purifying a protein from solution as described herein, wherein said protein formulation is filtered through a 0.2 μm filter, preferably at between 10-75 kg/m², such as 15-60 kg/m², 20-50 kg/m², or about 30 kg/m² or 40 kg/m².

In an embodiment, the present invention relates to a method for purifying a protein from solution as described herein, wherein said protein formulation is stable, and can be stored at room temperature (RT) for up to 168 h or for up to 2 y at −20° C., or even longer.

In an embodiment, the present invention relates to a method for purifying a protein from solution as described herein, wherein said protein formulation is administered to patients.

In certain embodiments, the protein formulation is administered to a subject by injection (e.g., subcutaneous, intravascular, intramuscular or intraperitoneal), by inhalation, orally or rectally.

In an embodiment, the present invention relates to a method for purifying a protein from solution as described herein, wherein said protein formulation is lyophilized.

In an embodiment, the present invention relates to a kit comprising the protein formulation of the invention and optionally a leaflet for use.

The Examples that follow are illustrative of specific embodiments of the disclosed method, and various uses thereof. They are set forth for explanatory purposes only, and should not be construed as limiting the scope of the invention in any way.

6 EXAMPLES

The objective was to develop an alternative and robust purification process for recombinantly expressed and secreted Nanobodies, with reduced CoG compared to standard processes, while retaining adequate quality. A further objective was the scalability of the process.

6.1 Materials & Methods

For all tangential flow filtration (TFF) steps the Sartoflow® SMART system (2 L fermenter equivalent) and the SartoJet® pump set-up (10 L and 100 L fermenter equivalent) from Sartorius were used.

All steps were performed at room temperature (RT) unless otherwise specified.

All analyses were performed in-house, using routine methods as known by the person skilled in the art, including:
- OD280 measurement: Protein Concentration Determination via 280 nm Absorbance Measurement on a Nano Drop ND-1000 Spectrophotometer (NanoDrop™ 1000).
- DNA measurement was done via a qPCR-based Assay for the Detection and Quantification of Residual Host Cell DNA in Purified Samples.
- SE-HPLC: purity assay of the ALX-Nanobody® by size exclusion high performance Liquid chromatography.
- PA-HPLC: protein A affinity high performance liquid chromatography (PA-HPLC) assay for concentration determination of the ALX-Nanobody®.

6.2 Starting Material

Starting material was cell broth containing ALX-Nanobody expressed and secreted by *Pichia pastoris* essentially as described elsewhere (Joosten et al., 2003 Microb Cell Fact. 30:1, Rahbarizadeh et al. 2006 Mol Immunol. 43:426-435). The target end concentration was 9 g/L cell broth (measured with PA-HPLC). The ALX-Nanobody was a monovalent polypeptide comprising one VHH, and having a molecular weight of 13.4 kDa (non-reduced conditions).

6.3 First Filtration Step (Clarification)

The aim of the first filtration step (diafiltration) was to separate *Pichia pastoris* host cells from the secreted target product and reduce the level of process-related impurities such as host cell protein (HCP), DNA and color as well as product-related variants such as high molecular weight (HMW) contaminants (clarification).

The Sartoflow SMART system (2 L fermenter equivalent) and the SartoJet pump set-up (10 L & 100 L fermenter equivalent) from Sartorius were used. The TFF membrane was a mPES hollow fiber filter module (Spectrum Labs) with a pore size of 50 kDa NMWCO. Purified water was used for the first filtration step, without any pH adjustment or conductivity adjustment of the starting material.

After priming the membrane with purified water and subsequently the cell broth, the permeate valve was opened, and the transmembrane pressure (TMP) was adjusted to 1 bar. The first filtration step was performed with 2 DV (Diafiltration volumes) purified water.

Routinely, more than 80% of the product was recovered in the (first) permeate as measured by PA-HPLC.

In case the ALX-Nanobody was to be stored, a filtering step was performed, using a 0.45/0.2 µm Sartopore® 2 filter (Sartorius). After this filtration step the filtrate was stored up to 72 h at RT.

6.4 Second Filtration Step (Concentration Step)

The aim of the second filtration step (ultrafiltration) was twofold. First, this step was used to concentrate the permeate to a target concentration of 120±10 mg/ml. Second, this step was used to reduce the amount of various small impurities.

The Sartoflow SMART system (2 L fermenter equivalent) and the SartoJet pump set-up (10 L & 100 L fermenter equivalent) from Sartorius were operated. For the second filtration step, the TFF membrane was a hollow fiber filter module (Hydrosart®) with a pore size of 10 kDa (Sartocon® Slice cassette; Sartorius Stedim). Purified water was also used for the second filtration step, again without any pH adjustment or conductivity adjustment of the starting material. Load was 0.7-1 kg ALX-Nanobody per $m^2$ membrane surface area.

After priming the membrane with water and subsequently the first permeate, the permeate valve was opened, and the TMP was adjusted to 1.25 bar. The first retentate comprising the ALX-Nanobody was collected, when reaching a concentration of 120±10 mg/ml (total protein).

In general, 100% of the product was recovered in the first retentate as measured by PA-HPLC.

In case the ALX-Nanobody was to be stored, a filtering step was performed, using a 0.45/0.2 µm Sartopore 2 filter (Sartorius). After this filtration step the filtrate was stored up to 72 h at RT.

6.5 Precipitation, Wash and Resuspension Step

The aim of the precipitation, wash and resuspension step was to precipitate the ALX-Nanobody, and to wash the precipitate, keeping the ALX-Nanobody® precipitated while process-related impurities (e.g. cell wall derived components), were resuspended and reduced via filtration through a membrane having a pore size of 0.2 µm. Notably, the precipitate was not able to pass the membrane. Next, resuspension of the ALX-Nanobody was performed by dilution with purified water, after which the soluble ALX-Nanobody was filtrated through said membrane, while any remaining solid impurities where retained.

The precipitation, wash and resuspension step were all performed in the Sartoflow SMART system (2 L fermenter equivalent) and the SartoJet pump set-up (10 L or 4*10 L fermenter equivalent) from Sartorius.

Precipitation was performed by addition of a 3.1 M stock solution of Ammonium sulphate (($NH_4)_2SO_4$) targeting an end concentration of 1.8 M Ammonium Sulphate and about 50 mg/mL protein concentration. The 3.1 M Ammonium Sulphate stock solution was gradually added while gentle stirring at RT, until the precipitate was formed.

After precipitation, the precipitate was stored for 2 h up to 24 h at RT.

The wash step was performed using a TFF membrane, i.e. cassette filter module (Hydrosart) with a pore size of 0.2 µm (Sartocon Slice cassette; Sartorius Stedim), and a load of: 0.6-0.8 kg ALX-Nanobody per $m^2$ membrane surface area.

Diafiltration was executed with 5 DV of 1.8 M Ammonium Sulphate.

Purified water was added to reach a final concentration of 0.6 M Ammonium Sulphate in order to resuspend the ALX-Nanobody precipitate (second retentate). The second retentate comprising the resuspended, soluble ALX-Nanobody was subsequently filtrated through the membrane (pore size 0.2 µm), resulting in the second permeate.

Generally, more than 75%-80% of the protein was recovered after precipitation, washing, resuspension and filtration (second permeate) as measured by PA-HPLC.

When no immediately processing was planned, the 0.6 M Ammonium Sulphate second permeate sample was filtered through 0.45/0.2 µm Sartopore 2 filter (Sartorius). After this filtration step the filtrate was stored up to 72 h at RT.

6.6 Ultrafiltration/Diafiltration (UF/DF) Step

The aim of the UF/DF step was to concentrate the product and to exchange the 0.6 M Ammonium Sulphate buffer to a primary buffer The UF/DF steps were executed on the Sartoflow SMART system (2 L fermenter equivalent) and the SartoJet pump set-up (10 L & 100 L fermenter equivalent) from Sartorius as described above. The TFF membrane was a cassette filter module (Sartocon Slice cassette, from Sartorius Stedim) with a cut-off of 10 kDa (HydroSart). The primary buffer was 20 mM citrate pH 6.0.

After priming the membrane with water and subsequently the second permeate of step 6.5, the permeate valve was opened, and the transmembrane pressure (TMP) was adjusted to 1.2 bar. The first DF step was performed with 1 DV primary buffer (first diafiltrate comprising the ALX-Nanobody). Next, an UF step was completed until the ALX-Nanobody reached a concentration of 55 mg/ml (third retentate). Subsequently, a second DF step was performed with 4 DV primary buffer (second diafiltrate comprising the ALX-Nanobody).

Routinely, more than 98% of the ALX-Nanobody was recovered, at a concentration of at least 50 mg/ml as measured by PA-HPLC.

In case the ALX-Nanobody was to be stored, a filtering step was performed, using a 0.45/0.2 µm Sartopore 2 filter (Sartorius). After this filtration step the filtrate was stored up to 72 h at RT.

6.7 Formulation and Final Filtration Step

A general and simplified purification process is described above, requiring only precipitation and filtration steps, which were all executed in the same apparatus. The end product was a purified protein in a primary buffer, but without any further excipient(s).

However, for various reasons such as e.g. storage, ease of administration, lyophilisation, etc., the final formulation may require excipients, which may or may not have an effect on the UF/DF step. Although the formulation and final filtration step is not explicitly part of purification method of the invention, adding a separate formulation step to the purification process of the invention facilitates on the one hand the generality of the foregoing purification process method and on the other hand opens up possibilities to adjust the final formulation.

In this case, the ALX-Nanobody of 50 mg/ml in 20 mM citrate buffer pH 6.0 was diluted with 16.6 mg/ml mannitol (in 20 mM citrate buffer at pH 6.0) under continuous stirring art RT until 20 mg/ml ALX-Nanobody was obtained.

A 0.45/0.2 µm aseptic filtration step on Sartopore 2 filter (Sartorius) was performed under standard conditions. The bulk liquid purified ALX-Nanobody was stored at ≤−20° C. In addition, it was shown that the liquid purified ALX- Nanobody could be stored after filtration for more than 168 h at RT, without losing activity.

Routinely, more than 96% of the product was recovered, as measured by PA-H PLC.

6.8 Conclusion Case Study Chromatography-Free DSP

Above is a general and simplified purification procedure described, which resulted in a final process recovery of at least 62% compared to the starting amount of the protein in solution, with a product quality that is comparable to conventional DSP processes using chromatography steps. Only the HCP content is slightly higher, but within acceptable standards for various purposes.

6.9 Scalability (MIP-run)

The purification process described above was performed with on a 10 L scale. To evaluate the scalability of the purification process and to ensure an efficient and successful transfer to an CMO a Man-in-Plant (MIP) run at 100 L fermentation scale was done. In addition, a 2000 L run was performed.

In essence, the purification process described above was repeated but at a larger scale.

6.9.1 Starting material

Starting material for the clarification was approx. 109 L cell broth containing an ALX-Nanobody, which was expressed and secreted by *Pichia pastoris* in minimal medium. The end concentration of the fermenter was 9.1 g/L cell broth (11.9 g/L cell free) (measured with PA-HPLC method).

No pH or conductivity adjustment of starting material were performed.

6.9.2 First Filtration Step

The first filtration step was as described above, but now the hollow Fiber used for clarification step of the MIP-run was a MiniKros membrane NO6-EO50-10-N with a surface area of 5100 $cm^2$ from SpectrumLabs with a filter height of 65 cm.

In order to assess the effectiveness of the diafiltration volume, two modes were tested using (i) 2 DV, i.e. as described before; and (ii) 3 DV.

Both 2 DV and 3 DV resulted in essentially the same outcome.

6.9.3 Second Filtration Step

The second filtration step was essentially as described above, including the filters used.

6.9.4 Precipitation, Wash and Resuspension Step

The precipitation, wash and resuspension step were essentially as described above, including the filters used.

6.9.5 UF/DF Step

The UF/DF steps were essentially as described above, including the filters used. The obtained concentration of the ALX-Nanobody was 52 mg/mL.

6.9.6 Formulation and Final Filtration Step

The formulation step was essentially performed as described above, but using a stock concentration of 16.3 mg/ml mannitol to reach a final concentration of 10 mg/mL mannitol.

6.10 Quality Analysis

The finally obtained concentration of Liquid Purified ALX-Nanobody® ("second diafiltrate") during the MIP run was 19.4 mg/mL. The recovery rates of the different process steps ranged from 77-100%, resulting in an overall process recovery of 63%.

6.10.1 RP-UHPLC

RP-UHPLC was used for characterization of intermediate and end samples obtained from the MIP run. This method has been qualified as a limit test for the product-related variants unpaired cysteines variant and carbamylated variant(s), if present. The relative amounts of missing S-S variants and carbamylated variants were determined by measuring the post-peak surface area of the respective peaks eluting from the RP-UHPLC column relative to that of the total surface (expressed as %).

The Reverse-phase ultra-high performance liquid chromatography (RP-UHPLC) analysis showed that the liquid purified ALX-Nanobody contained 0.6% of missing S-S variants and 1.8% of carbamylated variants.

6.10.2 SE-HPLC

SE-HPLC was used to monitor the level of high molecular weight (HMW) species of ALX-Nanobody for different intermediate steps of the purification process and for the final product (FIG. 1). Additionally, intact ALX-Nanobody (main peak) and low molecular weight (LMW, proteolytic degradation, present as post-peaks) could also be detected.

The SE-HPLC analysis of the intermediate and end samples from the MIP run showed a decrease of the HMW species (% pre-peak) during the purification process from 5.1% for the 10 kD Ultrafiltration retentate filtered to 3.1% for the final liquid purified ALX-Nanobody. An overlay of the different SE-HPLC analyses of the different samples of the MIP run are shown in FIG. 1.

6.10.3 CE-IEF Product Analysis

Different intermediate samples and the final liquid purified ALX-Nanobody from the MIP run were analyzed via capillary electrophoresis isoelectric focusing (CE-IEF) to determine the levels of product-related variants such as acidic variants and basic variants.

The CE-IEF analysis of the intermediate samples of the MIP run showed a decrease in the percentage of acidic variants during purification process. The percentage basic variants, which was already low (1-1.2%) and only showed a limited clearance (0.6%). The percentage acidic variants on the other hand was lowered from 19.8-22.7% to 3.4% in the liquid purified ALX-Nanobody.

6.10.4 Potency Analysis

Potency of the liquid purified ALX-Nanobody of the MIP run was evaluated in a qualified cell based functional potency assay.

Final liquid purified ALX-Nanobody had a relative potency of 108%.

6.10.5 Purity by Reducing CGE

The purity of different intermediate and the final liquid purified ALX-Nanobody samples from the MIP run was analyzed via capillary gel electrophoresis (CGE). This method tests for the presence of charged product-related variants An overview of the CGE integration data (% main peak) for the different samples is given in Table 1.

TABLE 1

Reducing CGE-analysis of the different samples of the MIP run.

| Sample | Main peak (%)2 | HMW (%) |
|---|---|---|
| 50 kD HF load | 91 | 2 |
| 50 kD HF permeate_filtered | 97 | 2 |
| 50 kD HF load | 92 | 3 |
| 50 kD HF permeate_filtered | 95 | 3 |
| Ultrafiltration10 kD retentate_filtered | 99 | 1 |
| 0.6M Ammonium Sulphate permeate_filtered | 100 | 0 |
| UF/DF 10 kD start retentate_filtered | 100 | 0 |
| Liquid purified ALX-Nanobody ® | 99 | 0 |

6.11 General Conclusions

The results obtained via this purification process (10 L, 100 L and 2000 L fermentation scale) demonstrated the robustness hereof (notably, the process has been already repeated various times with essentially the same results). Based on these results, the process was locked and considered suitable for GMP compliant Drug Substance (DS) manufacturing.

The described purification process resulted in a downstream process recovery range of 63% and reduced process-related impurities such as HCPs, mannan, DNA, color, as well as product-related variants such as HMW species.

In Table 2 a comparison of protein qualities is provided using a standard, conventional downstream process (DSP) purification method comprising chromatography and the present chromatography-free DSP purification method.

The present purification process has been tested extensively for monovalent Nanobodies (molecular weight between 12-15 kDa), but can be used for bivalent Nanobodies (comprising a molecular weight between 24-30 kDa) and trivalent Nanobodies (comprising a molecular weight between 36-45 kDa) as well. Similar conditions can be used for bivalent and trivalent Nanobodies as for monovalent Nanobodies. Nevertheless, adaptations to further optimize the present process for bivalent and trivalent Nanobodies are standard practice, if deemed necessary.

The present process has a higher process recovery and significantly lower cost-of-goods than conventional chromatography processes. When comparing the conventional DSP with the present purification process at the 100 L scale, a 86% reduction in costs was achieved, while qualities were adequate.

TABLE 2 comparison conventional and chromatography-free purification processes

| Product quality attribute | Nanobody DS by conventional DSP | Nanobody DS by chromatography-free DSP |
|---|---|---|
| Product purity (% Main peak SE-HPLC) | 99 | 97 |
| Product purity (% Main peak CE-IEF) | 93 | 96 |
| Product purity (% Main peak CGE) | 99 | 99 |
| Product purity (% Main peak RP-UHPLC) | 87 | 82 |
| HCP | <1 ppm | 238 ppm |

The invention claimed is:

1. A method for purifying a protein that is a polypeptide comprising one or more immunoglobulin single variable domains from a solution obtained from expression of the protein in a host or host cell, said method comprising:
   (a) a first filtration step comprising:
      (i) passing said solution through a first membrane, resulting in a first permeate, wherein said first membrane has a pore size of between 40 kDa and 100 kDa nominal molecular weight cut-off (NMWCO), wherein said first filtration step is effected by tangential flow (TFF) using purified water;
   (b) a second filtration step comprising:
      (i) concentrating the first permeate obtained at the end of step (a) using a second membrane, resulting in a first retentate comprising said protein, wherein said second membrane has a pore size of between 2 kDa and 50 kDa NMWCO, wherein said second filtration step is effected by TFF using purified water;
   (c) a precipitation, wash and resuspension step comprising:
      (i) precipitating said first retentate comprising said protein obtained at the end of step (b) using a precipitation solution comprising $((NH_4)^+)_2(SO_4)^{2-}$ until a precipitate comprising said protein is formed;
      (ii) washing said precipitate comprising said protein using a third membrane;
      (iii) resuspending the washed precipitate obtained at the end of step (c)(ii), resulting in a second retentate comprising said protein;
      (iv) filtrating the second retentate comprising said protein obtained at the end of step (c)(iii) through said third membrane, resulting in a second permeate comprising said protein,
   wherein said third membrane has a pore size between 0.05-0.35 μm, and wherein all of steps (c)(i), (c)(ii), (c)(iii), and (c)(iv) are effected in one and the same TFF device; and
   (d) an Ultrafiltration/Diafiltration (UF/DF) step comprising:
      (i) diafiltrating the second permeate comprising said protein obtained at the end of step (c) using a fourth membrane, resulting in a first diafiltrate comprising said protein, wherein said fourth membrane has a pore size of between 2 kDa and 50 kDa NMWCO;
      (ii) concentrating the first diafiltrate comprising said protein obtained at the end of step (d)(i) using said fourth membrane, resulting in a third retentate comprising said protein;

(iii) diafiltrating the third retentate comprising said protein of step (d)(ii) using said fourth membrane, resulting in a second diafiltrate comprising said protein;

wherein the protein has a molecular weight (MW) of between 5 kDa-200 kDa.

2. The method for purifying a protein from solution according to claim 1, wherein said first filtration step (a), said second filtration step (b), said precipitating step (c)(i), said washing step (c)(ii), said resuspending step (c)(iii), said filtrating step (c)(iv), said diafiltrating step (d)(i), said concentrating step (d)(ii), and said diafiltrating step (d)(iii) are effected by tangential flow filtration (TFF).

3. The method for purifying a protein from solution according to claim 1, wherein said first membrane, and/or said second membrane, and/or said third membrane, and/or said fourth membrane comprises modified polyether-sulfone (mPES), regenerated cellulose, polypropylene, cellulose acetate, polylactic acid, ceramic polyether-sulfone, polyarylsulphones, polysulfone, polyimide, polyamide, or polyvinyl-idenedifluoride (PVDF).

4. The method for purifying a protein from solution according to claim 1, wherein said first filtration step (a) comprises filtrating with 2-4 Diafiltrating Volumes (DV) purified water.

5. The method for purifying a protein from solution according to claim 1, wherein between 50%-100% of said protein is recovered in the first permeate.

6. The method for purifying a protein from solution according to claim 1, wherein said first permeate comprising said protein comprises 10%-100% less impurities than said solution.

7. The method for purifying a protein from solution according to claim 1, wherein the protein in said first retentate is concentrated to a concentration between 50-200 mg/ml.

8. The method for purifying a protein from solution according to claim 1, wherein said precipitating is effected at 1.4-2.2 M $((NH_4)^+)_2(SO_4)^{2-}$.

9. The method for purifying a protein from solution according to claim 1, wherein washing of said precipitate comprising said protein of step (c)(ii) comprises replacing the precipitation solution by a washing solution.

10. The method for purifying a protein from solution according to claim 1, wherein the washed precipitate obtained at the end of step (c)(ii) is resuspended in a resuspension solution comprising a precipitating agent with concentration between 0.8-0.4 M.

11. The method for purifying a protein from solution according to claim 1, wherein the second permeate comprising said protein obtained at the end of step (c) is diafiltrated with between 1-4 Diafiltrating Volumes (DV).

12. The method for purifying a protein from solution according to claim 1, wherein the protein in said third retentate has a concentration between 10-100 mg/ml.

13. The method for purifying a protein from solution according to claim 1, wherein the third retentate comprising said protein obtained at the end of step (d)(ii) is diafiltrated with 1-8 Diafiltrating Volumes (DV).

14. The method for purifying a protein from solution according to claim 1, further comprising formulating said second diafiltrate comprising said protein obtained at the end of step (d) in formulating buffer, resulting in a formulated product comprising said protein.

15. The method for purifying a protein from solution according to claim 14, wherein the formulated product comprises protein at a concentration of 10-100 mg/ml; and primary buffer.

16. The method for purifying a protein from solution according to claim 15, wherein the formulated product further comprises a stabilizer selected from the group consisting of sucrose, sorbitol, mannitol, glycine, inositol, sodium chloride, methionine, arginine, and arginine hydrochloride, from about 1-12%.

17. The method for purifying a protein from solution according to claim 15, wherein the formulated product further comprises a surfactant at a concentration of about 0.001% to 0.6%, selected from the group consisting of polysorbate-20, polysorbate-40, polysorbate-60, polysorbate-65, polysorbate-80 polysorbate-85, poloxamer-188, sorbitan monolaurate, sorbitan monopalmitate, sorbitan monostearate, sorbitan monooleate, sorbitan trilaurate, sorbitan tristearate, and sorbitan trioleaste.

18. The method for purifying a protein from solution according to claim 14, further comprising filtering the formulated product.

19. The method for purifying a protein from solution according to claim 2, wherein all steps (a), (b), (c)(i), (c)(ii), (c)(iii), (c)(iv), (d)(i), (d)(ii) and (d)(iii) are effected in one and the same TFF device.

20. The method for purifying a protein from solution according to claim 1, wherein the protein has a molecule weight of between 15-30 kDa.

* * * * *